United States Patent
Park et al.

(10) Patent No.: US 12,150,128 B2
(45) Date of Patent: Nov. 19, 2024

(54) METHOD AND DEVICE FOR OPERATING UE ASSOCIATED WITH SIDELINK RLM AND RLF IN WIRELESS COMMUNICATION SYSTEM

(71) Applicant: LG ELECTRONICS INC., Seoul (KR)

(72) Inventors: Giwon Park, Seoul (KR); Youngdae Lee, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 17/638,480

(22) PCT Filed: Aug. 25, 2020

(86) PCT No.: PCT/KR2020/011314
§ 371 (c)(1),
(2) Date: Feb. 25, 2022

(87) PCT Pub. No.: WO2021/040379
PCT Pub. Date: Mar. 4, 2021

(65) Prior Publication Data
US 2022/0322327 A1    Oct. 6, 2022

Related U.S. Application Data

(60) Provisional application No. 62/891,394, filed on Aug. 25, 2019, provisional application No. 62/891,403, (Continued)

(51) Int. Cl.
*H04W 72/20* (2023.01)
*H04L 1/1812* (2023.01)
*H04W 76/18* (2018.01)

(52) U.S. Cl.
CPC ........... *H04W 72/20* (2023.01); *H04L 1/1812* (2013.01); *H04W 76/18* (2018.02)

(58) Field of Classification Search
CPC ..... H04W 72/20; H04W 76/18; H04W 76/28; H04W 4/40; H04W 76/14; H04W 92/18;
(Continued)

(56) References Cited

U.S. PATENT DOCUMENTS

2023/0379089 A1* 11/2023 Loehr ................ H04L 1/1819

FOREIGN PATENT DOCUMENTS

WO     2019103670     5/2019

OTHER PUBLICATIONS

LG Electronics, "Discussion on AS level link management for unicast," 3GPP TSG-RAN WG1 #98, R1-1908909, Aug. 2019, 5 pages.

(Continued)

*Primary Examiner* — Eric Myers
(74) *Attorney, Agent, or Firm* — LEE, HONG, DEGERMAN, KANG & WAIMEY

(57) ABSTRACT

A method for operating a transmitting user equipment (TX UE) in a wireless communication system, according to one embodiment, comprises: a step in which the TX UE transmits sidelink control information (SCI); a step in which the TX UE transmits predetermined data in a resource region associated with the SCI; and a step in which, on the basis of feedback of a receiving (RX) UE which has received the data, the TX UE determines declaration of a sidelink radio link failure (RLF), wherein the predetermined data is transmitted on the basis of there being no data for the TX UE to transmit to the RX UE, and the predetermined data is associated with a trigger of the feedback.

9 Claims, 25 Drawing Sheets

Related U.S. Application Data filed on Aug. 25, 2019, provisional application No. 62/891,408, filed on Aug. 25, 2019.

(58) Field of Classification Search
CPC ... H04L 1/1812; H04L 1/1819; H04L 1/1822; H04L 2001/0093; H04L 1/1854; H04L 1/1893
See application file for complete search history.

(56) References Cited

OTHER PUBLICATIONS

InterDigital, Inc., "Physical Layer Procedures for NR V2X Sidelink," 3GPP TSG-RAN WG1 #98, R1-1909032, Aug. 2019, 13 pages.
Huawei, et al., "Considerations on RLM for NR V2X unicast," 3GPP TSG-RAN WG2 #107, R2-1911074, Aug. 2019, 7 pages.
Oppo, "Discussion of RLM for Unicast," 3GPP TSG-RAN WG1 #98, R1-1908365, Aug. 2019, 5 pages.
PCT International Application No. PCT/KR2020/011314, Written Opinion of the International Searching Authority dated Dec. 15, 2020, 10 pages.

* cited by examiner (a)

(b)

(a)

(b)

METHOD AND DEVICE FOR OPERATING UE ASSOCIATED WITH SIDELINK RLM AND RLF IN WIRELESS COMMUNICATION SYSTEM

CROSS-REFERENCE TO RELATED APPLICATIONS

This application is the National Stage filing under 35 U.S.C. 371 of International Application No. PCT/KR2020/011314, filed on Aug. 25, 2020, and claims the benefit of U.S. Provisional Application Nos. 62/891,394, filed on Aug. 25, 2019, 62/891,403, filed on Aug. 25, 2019, and 62/891,408, filed on Aug. 25, 2019, the contents of which are all incorporated by reference herein in their entirety.

TECHNICAL FIELD

The present disclosure relates to a wireless communication system, and more particularly to a method and a device for operating a user equipment (UE) related to sidelink radio resource monitoring (RLM) and radio link failure (RLF).

BACKGROUND ART

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of embodiment(s) may be methods of performing RLM, RLF, or the like when there is no data to be transmitted.

Technical Solution

According to an embodiment, an operating method of a transmitting user equipment (TX UE) in a wireless communication system includes transmitting sidelink control information (SCI) by the TX UE, transmitting predetermined data in a resource region related to the SCI by the TX UE, and based on feedback of a receiving UE (RX UE) that receives the data, determining declaration of sidelink radio link failure (RLF) by the TX UE, wherein the predetermined data is transmitted based on that there is no data to be transmitted to the RX UE by the TX UE, and the predetermined data is related to trigger of the feedback.

According to an embodiment, a transmitting user equipment (TX UE) in a wireless communication system includes at least one processor, and at least one computer memory operatively connected to the at least one processor and configured to store commands for allowing the at least one processor to perform operations when being executed, wherein the operations includes transmitting sidelink control information (SCI) by the TX UE, transmitting predetermined data in a resource region related to the SCI by the TX UE, and based on feedback of a receiving UE (RX UE) that receives the data, determining declaration of sidelink radio link failure (RLF) by the TX UE, wherein the predetermined data is transmitted based on that there is no data to be transmitted to the RX UE by the TX UE, and wherein the predetermined data is related to trigger of the feedback.

An embodiment provides a processor for performing operations for a transmitting user equipment (TX UE) in a wireless communication system, the operations including transmitting sidelink control information (SCI) by the TX UE, transmitting predetermined data in a resource region related to the SCI by the TX UE, and based on feedback of a receiving UE (RX UE) that receives the data, determining declaration of sidelink radio link failure (RLF) by the TX UE, wherein the predetermined data is transmitted based on that there is no data to be transmitted to the RX UE by the TX UE, and the predetermined data is related to trigger of the feedback.

An embodiment provides a computer-readable non-volatile recording medium for storing at least one computer program including a command for allowing at least one processor to perform operations for a transmitting user equipment (TX UE) when being executed by the at least one processor, the operations including transmitting sidelink control information (SCI) by the TX UE, transmitting predetermined data in a resource region related to the SCI by the TX UE, and based on feedback of a receiving UE (RX UE) that receives the data, determining declaration of sidelink radio link failure (RLF) by the TX UE, wherein the predetermined data is transmitted based on that there is no data to be transmitted to the RX UE by the TX UE, and the predetermined data is related to trigger of the feedback.

A hybrid automatic retransmit request-acknowledgment (HARQ) feedback report configuration of the TX UE may be configured to be disabled.

The TX UE may skip receiving a signal from the RX UE for a preconfigured time.

The TX UE may declare sidelink RLF based on HRAQ discontinuous transmission (DTX) for the predetermined data.

The predetermined data may be transmitted twice or more.

The TX UE may declare sidelink RLF based on that continuous HRAQ DTX for the predetermined data transmitted twice or more reaches a maximum value.

The maximum value may be represented via RRC signaling.

The SCI may include a HARQ feedback report option configured to be enabled.

The TX UE may request a HARQ feedback report configuration change to a base station (BS), and the TX UE may receive radio resource control (RRC) signaling, downlink control information (DCI), or a medium access control (MAC) control information (CE) HARQ feedback report configuration change from the BS.

The TX UE may change the HARQ feedback report configuration, configured to be disabled, to be enabled.

The TX UE may inform the RX UE of a change in the HARQ feedback report configuration through a dedicated PC5 RRC signal, MAC CE, or SCI.

The TX UE may communicate with at least one of another UE, a UE related to an autonomous driving vehicle, a base station (BS), or a network.

Advantageous Effects

An embodiment may overcome a problem in which a resource needs to be continuously maintained because RLF is not capable of being declared even if there is no data to be transmitted by the TX UE.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Best Mode

In various embodiments of the present disclosure, "I" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
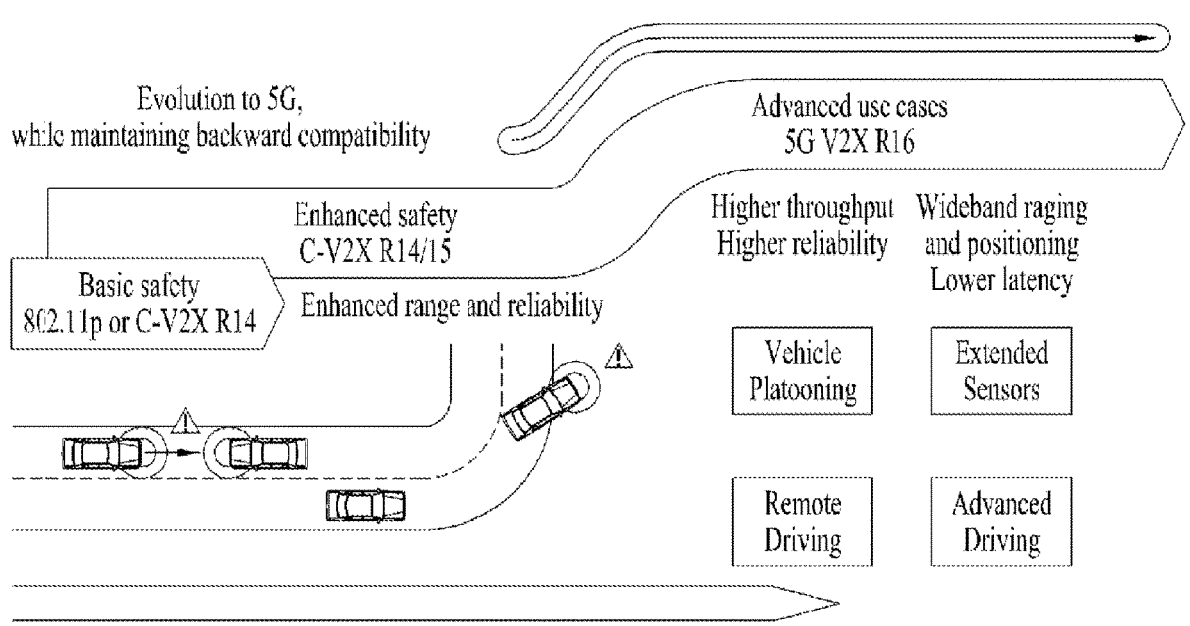
FIG. 1 is a diagram comparing vehicle-to-everything (V2X) communication based on pre-new radio access technology (pre-NR) with V2X communication based on NR.
Figure 2:
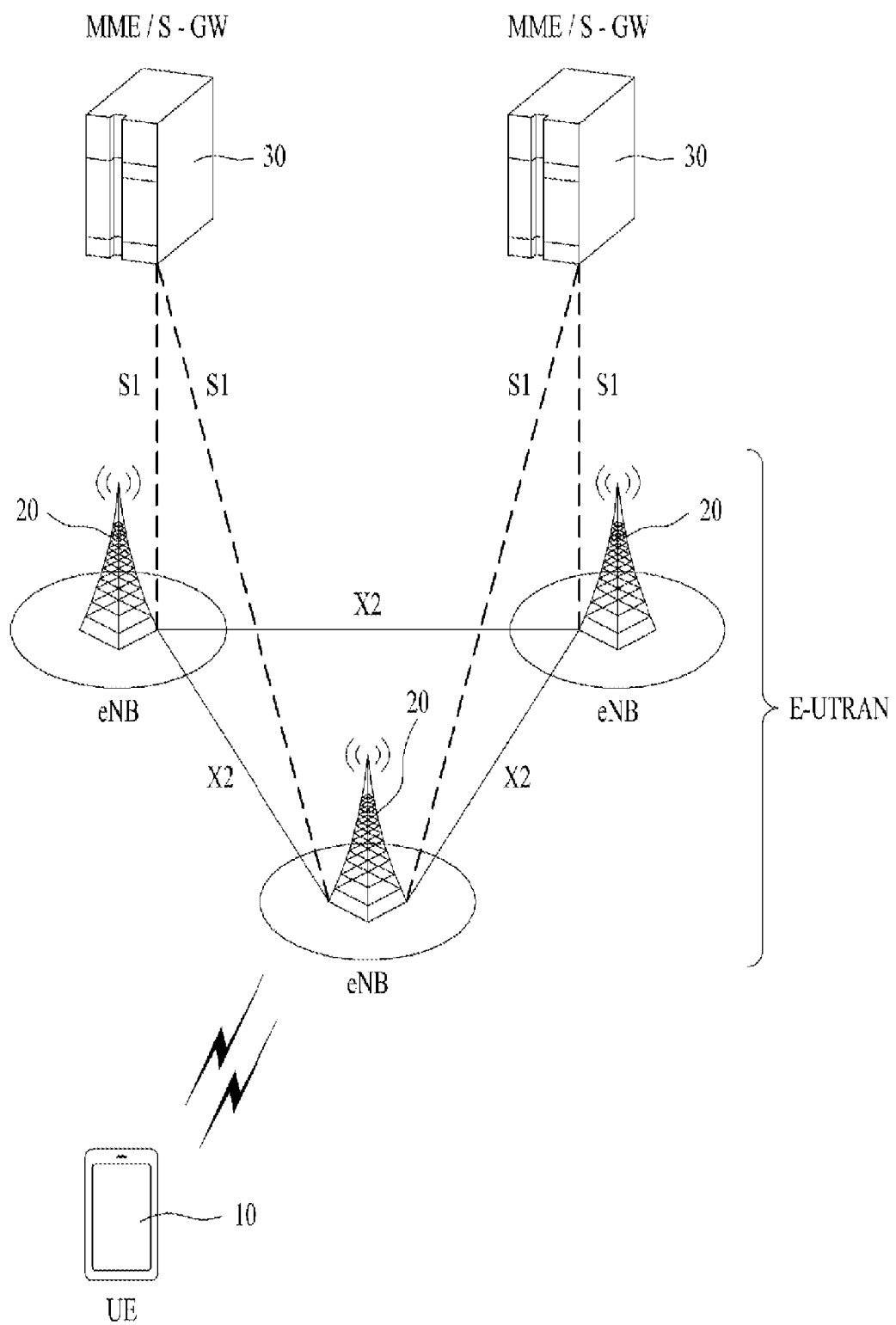
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
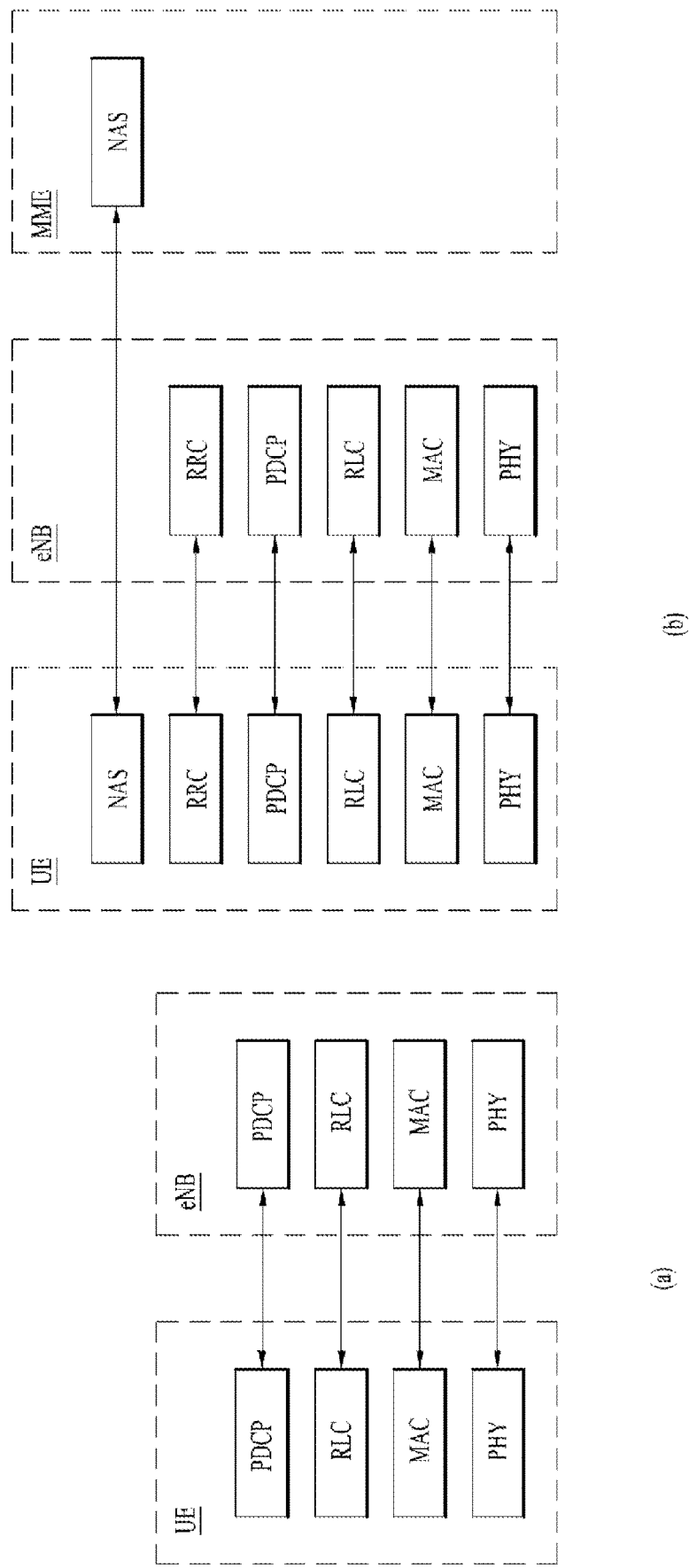
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
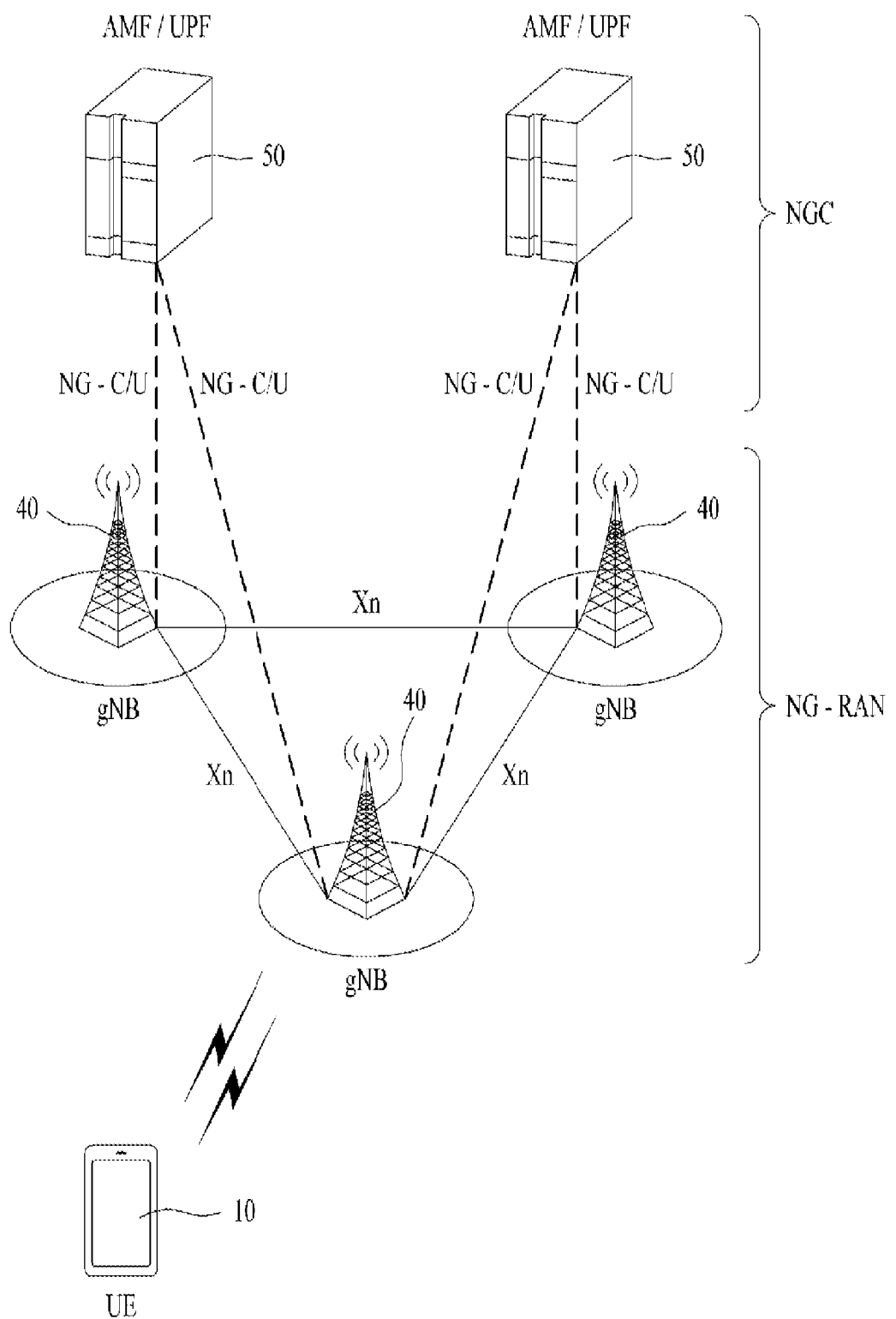
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
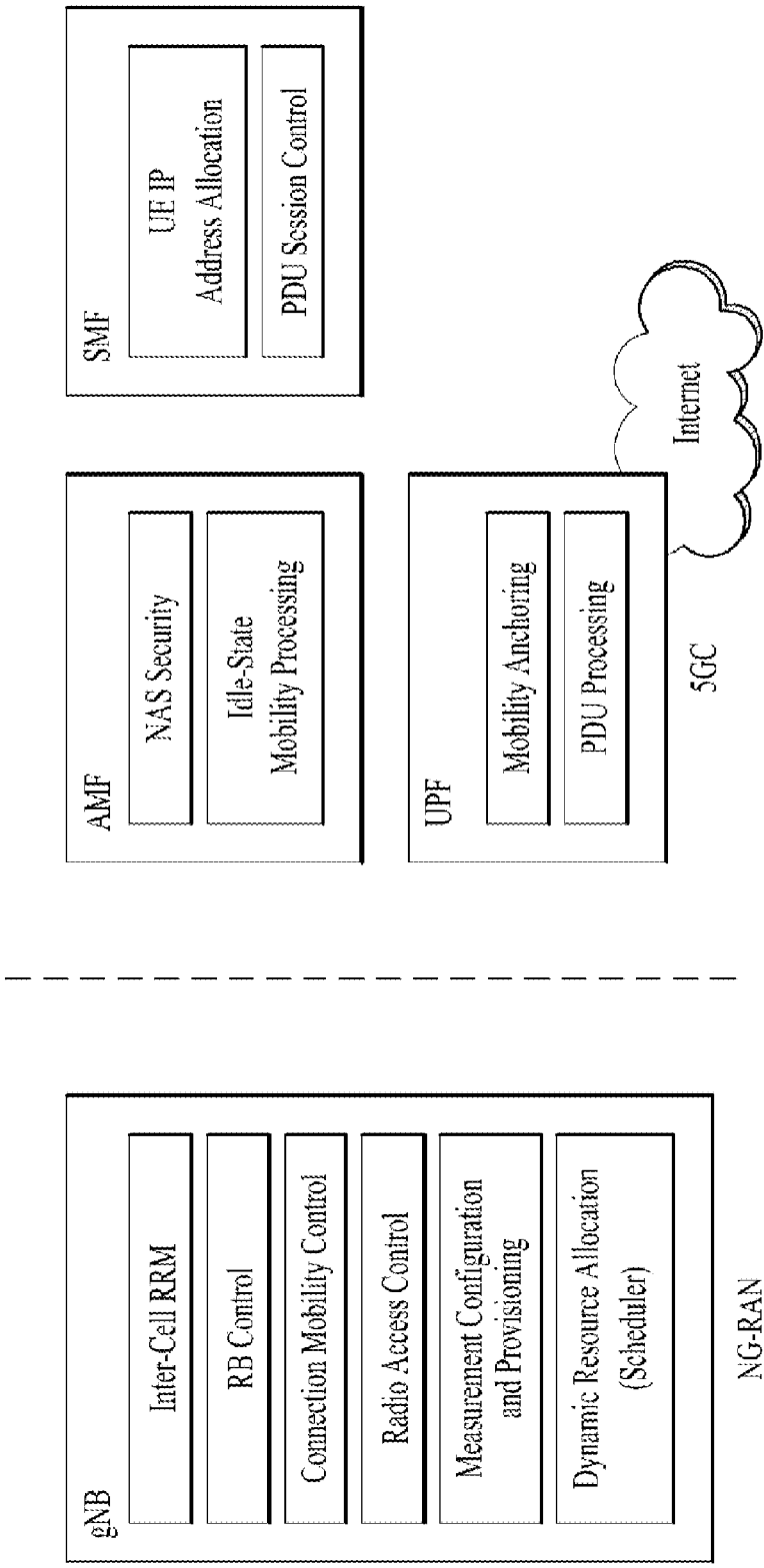
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
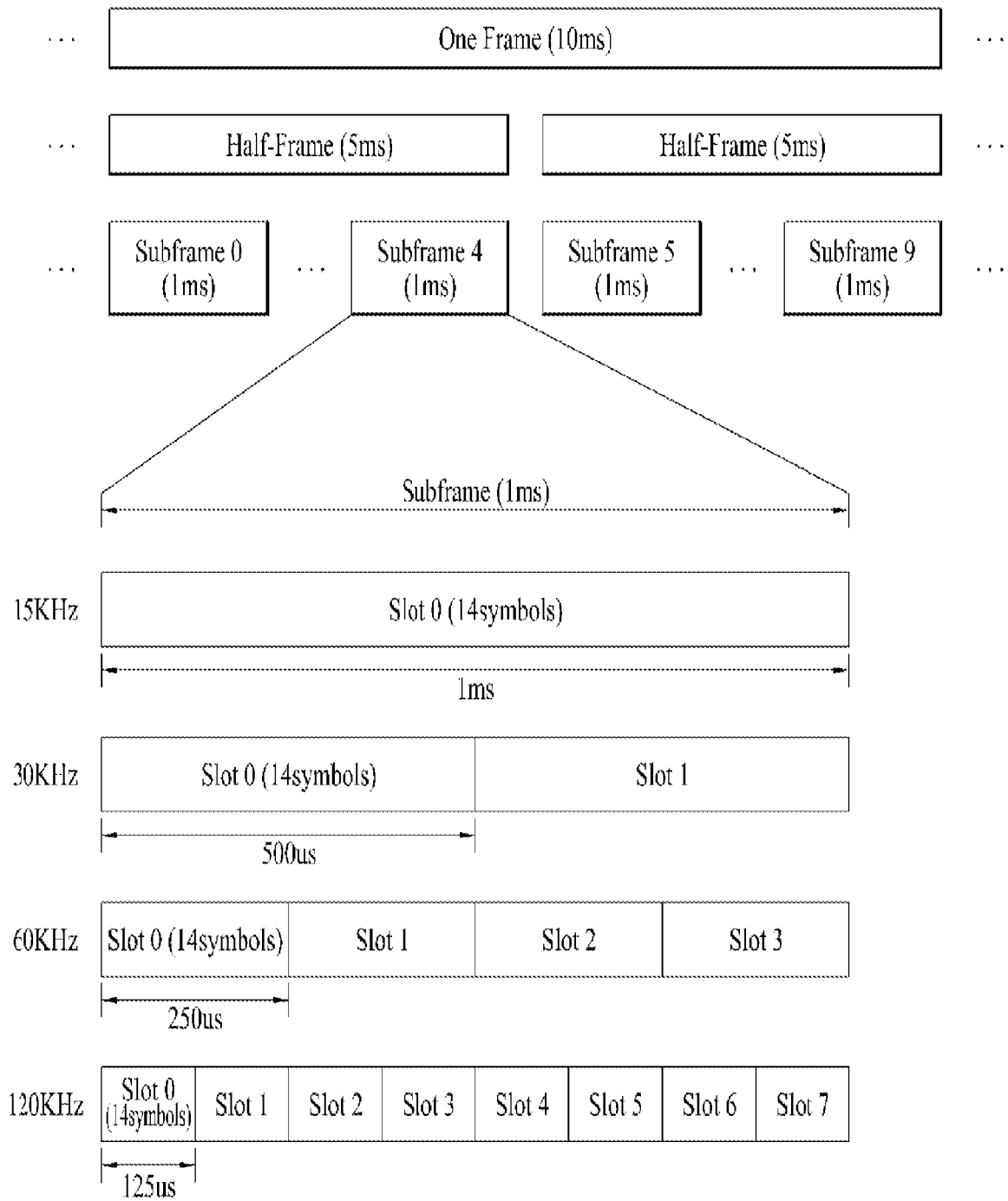
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration µ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in Table 3. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in Table 4. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
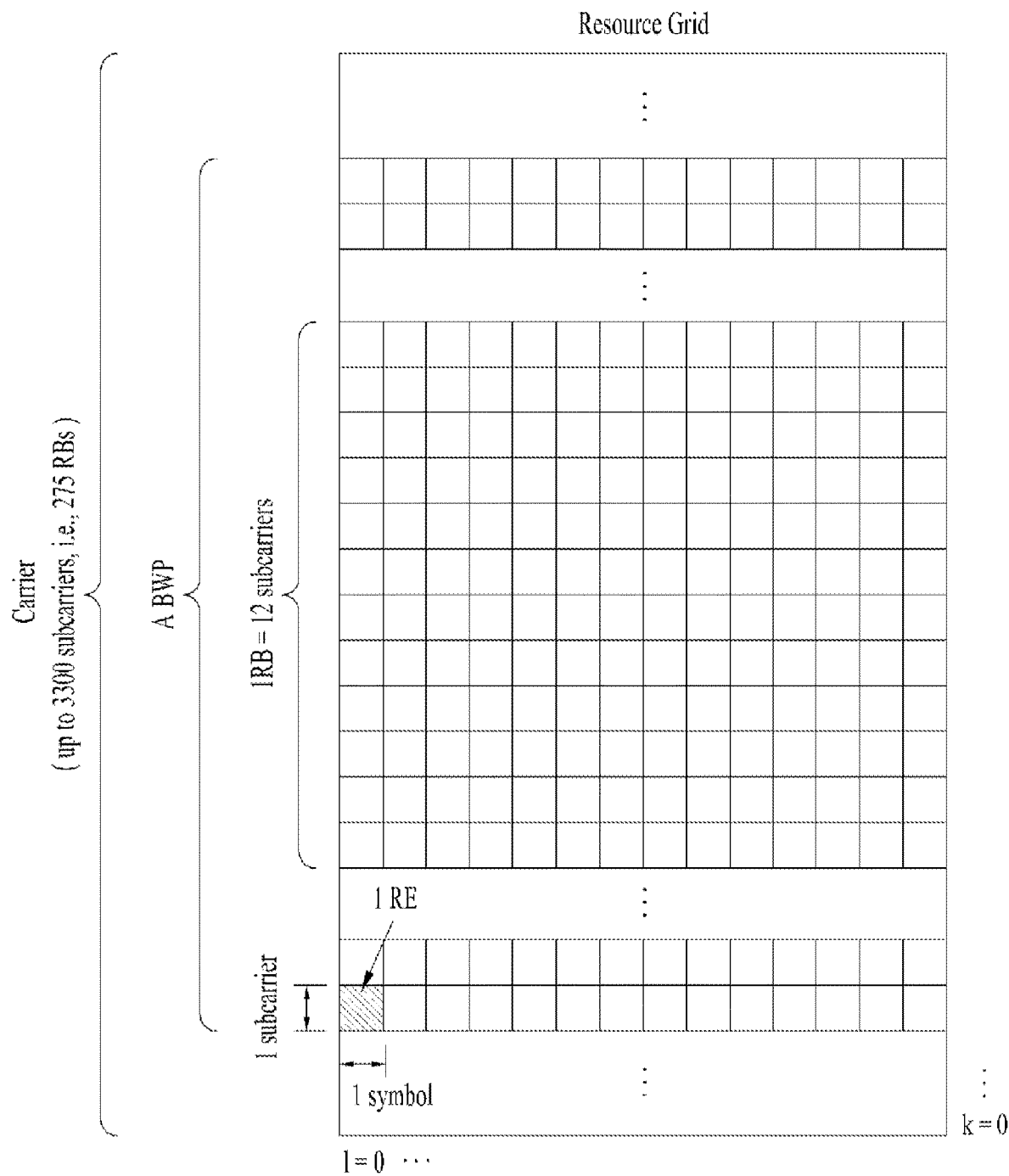
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
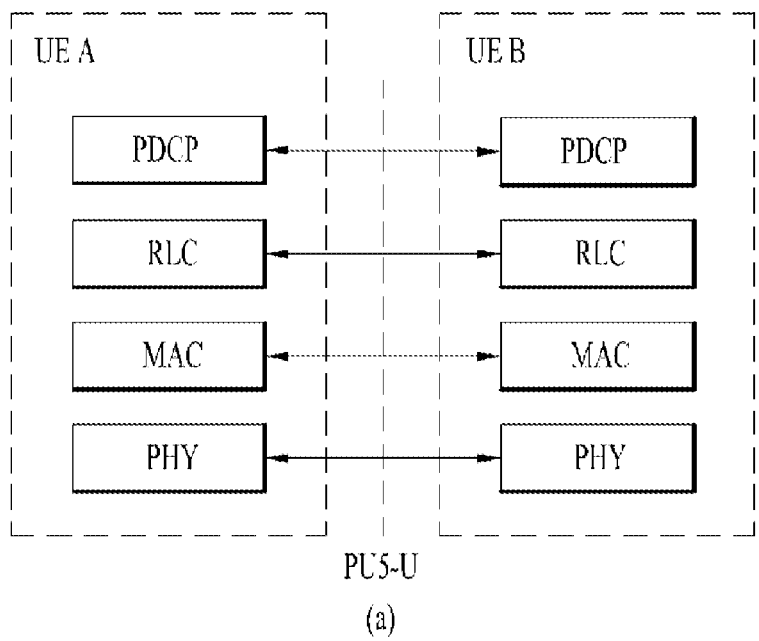
FIG. 8 is a diagram illustrating radio protocol architectures for sidelink (SL) communication according to an embodiment of the present disclosure.
Figure 8:
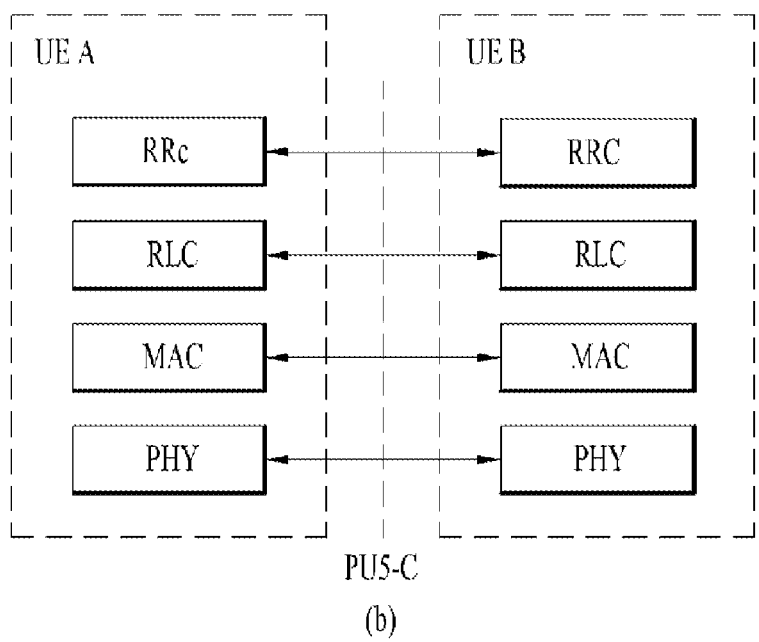

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
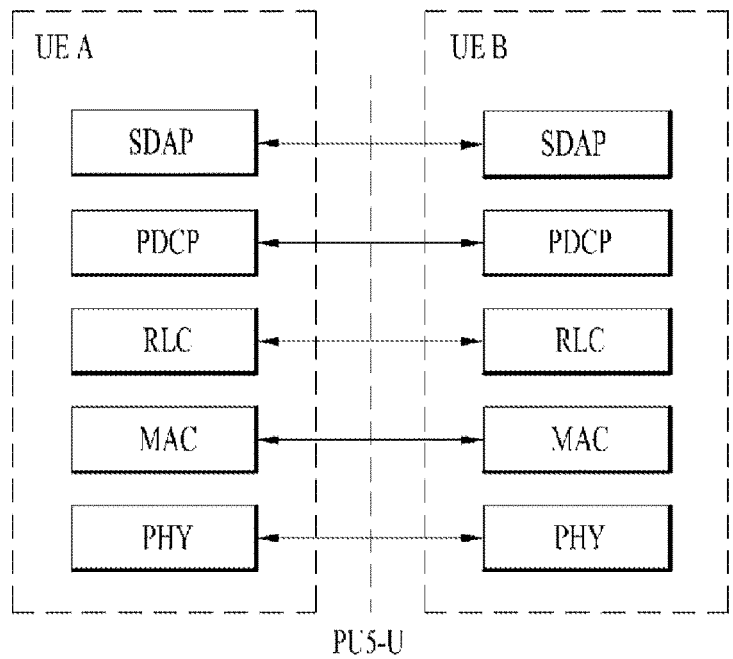
FIG. 9 is a diagram illustrating radio protocol architectures for SL communication according to an embodiment of the present disclosure.
Figure 9:
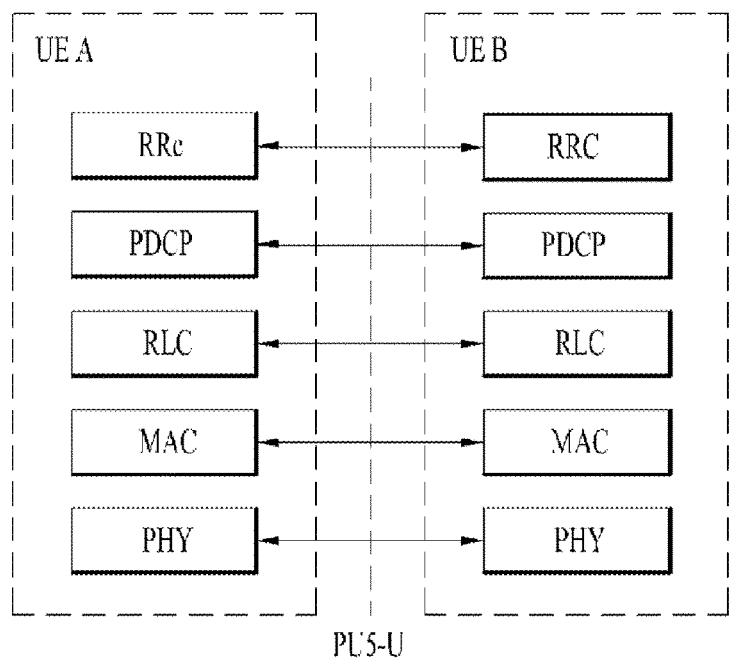

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Resource allocation in SL will be described below.

Figure 10:
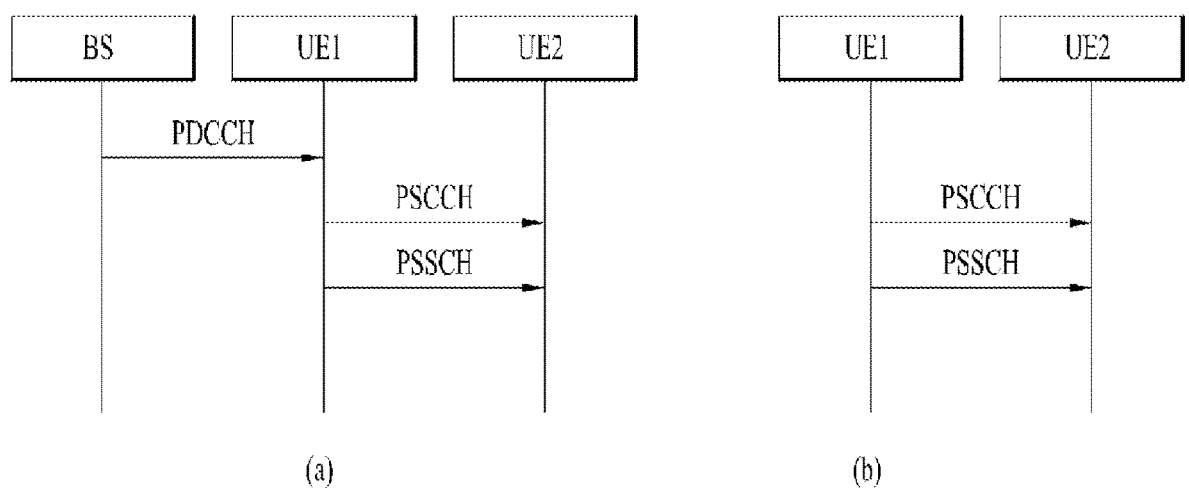
FIG. 10 illustrates a synchronization source or a synchronization reference of V2X according to an embodiment of the present disclosure.

FIG. 10 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 10(a) illustrates a UE operation related to LTE transmission mode 1 or LTE transmission mode 3. Alternatively, for example, FIG. 10(a) illustrates a UE operation related to NR resource allocation mode 1. For example, LTE transmission mode 1 may be applied to general SL communication, and LTE transmission mode 3 may be applied to V2X communication.

For example, FIG. 10(b) illustrates a UE operation related to LTE transmission mode 2 or LTE transmission mode 4. Alternatively, for example, FIG. 10(b) illustrates a UE operation related to NR resource allocation mode 2.

Referring to FIG. 10(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 10(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or group cast).

For example, the transmitting UE may transmit all or part of the following information to the receiving UE by SCI. For example, the transmitting UE may transmit all or part of the following information to the receiving UE by first SCI and/or second SCI.

- PSSCH-related and/or PSCCH-related resource allocation information, for example, the positions/number of time/frequency resources, resource reservation information (e.g. a periodicity), and/or
- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or
- MCS information, and/or
- transmission power information, and/or
- L1 destination ID information and/or L1 source ID information, and/or
- SL HARQ process ID information, and/or
- new data indicator (NDI) information, and/or
- redundancy version (RV) information, and/or
- QoS information (related to transmission traffic/packet), for example, priority information, and/or
- an SL CSI-RS transmission indicator or information about the number of SL CSI-RS antenna ports (to be transmitted);
- location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, group cast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Hereinafter, radio link monitoring (SL RLM) will be described.

In the case of AS-level link management in unicast, radio link monitoring (SL RLM) and/or radio link failure (RLF) declaration may be supported. In the case of an RLC acknowledged mode (AM) in SL unicast, the RLF declaration may be triggered by indication from the RLC indicating that the maximum number of retransmissions has been reached. An AS-level link status (e.g., failure) needs to be known to a higher layer. Differently from an RLM procedure for unicast, group cast-related RLM design may not be considered. RLM and/or RLF declaration among group members for group cast may not be required.

For example, a transmitting user equipment (TX UE) may transmit a reference signal to a receiving user equipment (RX UE), and the RX UE may perform SL RLM using the reference signal. For example, the RX UE may declare SL RLF using the reference signal. For example, the reference signal may be referred to as an SL reference signal.

Hereinafter, SL measurement and reporting will be described.

For the purpose of QoS prediction, initial transmission parameter setting, link adaptation, link management, admission control, or the like, SL measurement and reporting (e.g., RSRP or RSRQ) between UEs may be considered in SL. For example, the RX UE may receive a reference signal from the TX UE, and the RX UE may measure a channel state for the TX UE based on the reference signal. The RX UE may report channel state information (CSI) to the TX UE. SL-related measurement and reporting may include measurement and reporting of CBR and reporting of location information. Examples of channel status information (CSI) of V2X may include a channel quality indicator (CQI), a precoding matrix index (PMI), a rank indicator (RI), reference signal received power (RSRP), reference signal received quality (RSRQ), pathgain/pathloss, SRI (SRS, Sounding Reference Symbols, Resource Indicator), a CSI-RS Resource Indicator (CRI), an interference condition, and a vehicle motion. In the case of unicast communication, CQI, RI, and PMI or some of them may be supported by non-subband-based aperiodic CSI report in which four or less antenna ports are assumed are assumed. A CSI procedure may not be dependent upon a standalone RS. The CSI report may be activated and deactivated according to configuration.

For example, the TX UE may transmit the CSI-RS to the RX UE, and the RX UE may measure a CQI or an RI using the CSI-RS. For example, the CSI-RS may be referred to as an SL CSI-RS. For example, the CSI-RS may be confined within PSSCH transmission. For example, the TX UE may include the CSI-RS in a PSSCH resource and may transmit the same to the RX UE.

Hereinafter, a hybrid automatic repeat request (HARQ) procedure will be described.

An error compensation scheme for ensuring the reliability of communication may include a forward error correction (FEC) scheme and an automatic repeat request (ARQ) scheme. In the FEC scheme, error at a receiving may be corrected by adding an extra error correction code to information bits. The FEC scheme may have an advantage of having a small time delay and no separate information exchange between transmitting and receiving ends, but has a disadvantage of lowering system efficiency in a good channel environment. The ARQ scheme may increase transmission reliability, but may have a disadvantage that a time delay occurs and system efficiency decreases in a poor channel environment.

The hybrid automatic repeat request (HARQ) scheme may be configured by combining the FEC and the ARQ, may check whether data received by a physical layer contains error that is not capable of being decoded, and may request retransmission when error occurs to improve performance.

In the case of SL unicast and group cast, HARQ feedback and HARQ combining at a physical layer may be supported. For example, when the RX UE operates in a resource allocation mode 1 or 2, the RX UE may receive a PSSCH from the TX UE, and the RX UE may transmit HARQ feedback to the PSSCH to the TX UE using a sidelink feedback control information (SFCI) format through a physical sidelink feedback channel (PSFCH).

For example, the SL HARQ feedback may be enabled for unicast. In this case, in a non-code block group (non-CBG) operation, when the RX UE decodes a PSCCH with the RX UE as a target and successfully decodes a transmission block related to the PSCCH, the RX UE may generate HARQ-ACK. The RX UE may transmit the HARQ-ACK to the TX UE. In contrast, when the RX UE does not successfully decode the transmission block related to the PSCCH after decoding a PSCCH with the RX UE as a target, the RX UE may generate HARQ-NACK. The RX UE may transmit the HARQ-NACK to the TX UE.

For example, SL HARQ feedback may be enabled for group cast. For example, in a non-CBG operation, two HARQ feedback options may be supported for group cast.

(1) Group cast option 1: After the RX UE decodes a PSCCH with the RX UE as a target, when the RX UE fails to decode a transmission block related to the PSCCH, the RX UE may transmit HARQ-NACK to the TX UE through a PSFCH. In contrast, when the RX UE decodes a PSCCH with the RX UE as a target and successfully decodes a transmission block related to the PSCCH, the RX UE may not transmit HARQ-ACK to the TX UE.

(2) Group cast option 2: After the RX UE decodes a PSCCH with the RX UE as a target, when the RX UE fails to decode a transmission block related to the PSCCH, the RX UE may transmit HARQ-NACK to the TX UE through a PSFCH. When the RX UE decodes a PSCCH using the RX UE as a target and RX UE successfully decodes a transmission block related to the PSCCH, the RX UE may transmit the HARQ-ACK to the TX UE through a PSFCH.

For example, when the group cast option 1 is used in SL HARQ feedback, all UEs that perform group cast communication may share a PSFCH resource. For example, UEs belonging to the same group may transmit HARQ feedback using the same PSFCH resource.

For example, when the group cast option 2 is used in SL HARQ feedback, respective UEs that perform group cast communication may use different PSFCH resources for HARQ feedback transmission. For example, UEs belonging to the same group may transmit HARQ feedback using different PSFCH resources.

For example, when SL HARQ feedback is enabled for group cast, the RX UE may determine whether to transmit HARQ feedback to the TX UE based on a transmission-reception (TX-RX) distance and/or RSRP.

For example, in the case of HARQ feedback based on the TX-RX distance in the group cast option 1, when the TX-RX distance is equal to or less than communication coverage requirements, the RX UE may transmit HARQ feedback for the PSSCH to the TX UE. In contrast, when the TX-RX distance is greater than the communication coverage requirements, the RX UE may not transmit the HARQ feedback for the PSSCH to the TX UE. For example, the TX UE may inform the RX UE of the location of the TX UE through SCI related to the PSSCH. For example, the SCI related to the PSSCH may be second SCI. For example, the RX UE may estimate or acquire the TX-RX distance based on the location of the RX UE and the location of the TX UE. For example, the RX UE may decode the SCI related to the PSSCH to know communication coverage requirements used in the PSSCH.

For example, in the case of the resource allocation mode 1, a time between the PSFCH and the PSSCH may be configured or preconfigured. In the case of unicast and group cast, when retransmission on SL is required, this may be indicated to an eNB by a UE within coverage using the PUCCH. The TX UE may also transmit indication to a serving eNB of the TX UE in the form of scheduling request (SR)/buffer status report (BSR) not in the form of HARQ ACK/NACK. Even if the eNB does not receive the indication, the eNB may schedule an SL retransmission resource to a UE. For example, in the case of the resource allocation mode 2, a time between the PSFCH and the PSSCH may be configured or preconfigured.

For example, in terms of transmission in a carrier of a UE, TDM between the PSCCH/PSSCH and the PSFCH may be allowed with respect to a PSFCH format for SL in a slot. For example, a sequence-based PSFCH format having one symbol may be supported. Here, the one symbol may not be an AGC duration. For example, the sequence-based PSFCH format may be applied to unicast and group cast.

For example, in a slot related to a resource pool, a PSFCH resource may be configured periodically in an N-slot duration or may be preconfigured. For example, N may be configured to one or more values equal to or greater than 1. For example, N may be 1, 2, or 4. For example, HARQ feedback for transmission in a specific resource pool may be transmitted through only a PSFCH on the specific resource pool.

For example, when the TX UE transmits a PSSCH to the RX UE over slot #X to slot #N, the RX UE may transmit HARQ feedback for the PSSCH to the TX UE in a slot #(N+A). For example, the slot #(N+A) may include a PSFCH resource. Here, for example, A may be the smallest integer equal to or greater than K. For example, K may be the number of logical slots. In this case, K may be the number of slots in the resource pool. Alternatively, for example, K may be the number of physical slots. In this case, K may be the number of slots inside and outside the resource pool.

For example, when the RX UE transmits HARQ feedback on the PSFCH resource in response to one PSSCH transmitted to the RX UE by the TX UE, the RX UE may determine a frequency domain and/or a code domain of the PSFCH resource based on an implicit mechanism within a configured resource pool. For example, the RX UE may determine the frequency domain and/or the code domain based on at least one of a slot index related to the PSCCH/PSSCH/PSFCH, a subchannel related to the PSCCH/PSSCH, and/or an identifier for identifying each RX UE in a group for HARQ feedback based on the group cast option 2. And/or, for example, the RX UE may determine the frequency domain and/or the code domain of the PSFCH resource based on at least one of SL RSRP, SINR, L1 source ID, and/or location information.

For example, when HARQ feedback transmission through a PSFCH of a UE and HARQ feedback reception through a PSFCH overlap, the UE may select any one of HARQ feedback transmission through a PSFCH or HARQ feedback reception through a PSFCH based on a priority rule. For example, the priority rule may be based on the minimum priority indication of related PSCCH/PSSCH.

For example, when HARQ feedback transmission through a PSFCH for a plurality of UEs overlaps, the UE may select specific HARQ feedback transmission based on the priority rule. For example, the priority rule may be based on the minimum priority indication of the related PSCCH/PSSCH.

In the conventional art (NR-Uu), when the UE monitors radio link and determines that the radio link is impossible to communicate, the UE may declare radio link failure. For example, the UE may declare radio link failure in the following condition.

When an OUT OF SYNC (OOS) indication is consecutively received from a physical Layer N times and an IN SYNC (IS) indication is not received for a predetermined time When an RACH procedure fails N times When retransmission occurs the maximum number or more times in an RLC layer Sidelik Radio Link Monitoring (RLM) of the TX UE in NR V2X is introduced. The conventional art for HARQ Feedback transmission in NR V2X will be described below.

An eNB may configure a HARQ Feedback option to enable or disable a HARQ Feedback operation of the TX UE based on QoS requirements (reliability and latency) of Sidelink service (data) reported to the eNB by the TX UE and may inform the TX UE of the configured HARQ Feedback option. The TX UE may inform the RX UE of the HARQ Feedback (enable or disable) option configured by the eNB. The RX UE may determine whether to transmit HARQ Feedback (HARQ Feedback Enable) or not (HARQ Feedback Disable) for the data transmitted by the TX UE according to the HARQ Feedback option transferred by the TX UE.

In Sidelink RLM of conventional NR V2X, when the TX UE receives continuous (Max N times) HARQ NACK Feedback or does not receive continuous (Max N times) HARQ Feedback for Sidelink data transmitted to the RX UE (HRAQ DTX (discontinuous transmission, No feedback reception from RX UE)), the TX UE may declare sidelink radio link failure.

Based on the aforementioned conventional art, when the TX UE is not capable of transmitting anything because there is no sidelink data to be transferred to the RX UE, the TX UE may not perform sidelink RLM based on the HARQ Feedback. For example, since the TX UE does not transmit anything because there is no signal to be transmitted, the TX UE may not determine RLF based on the HARQ DTX. In another example, the TX UE needs to periodically receive a signal (control or data) from a peer RX UE for sidelink RLM, and based thereon, a physical layer of the TX UE may transfer an In Sync event or an Out of Sync event to an RRC layer. The RRC Layer of the TX UE may perform sidelink RLM based on the IS event or the OOC event received from the physical layer. Alternatively, the TX UE may perform sidelink RLM based on HARQ Feedback of the SL data transmitted to the RX UE. However, when the HARQ Feedback Option is configured to Disable, there may be a problem in that sidelink RLM/RLF based on HARQ Feedback is not normally performed. Thus, an embodiment proposes a method for performing sidelink RLM/RLF even if there is no sidelink data or sidelink signal to be transmitted to the RX UE by the TX UE (in other words, even if there is no data or signal to be transmitted to the RX UE by the TX UE). In addition, an embodiment proposes a method for changing (switching) a configuration of the HARQ Feedback option configured based on requirements of the sidelink service (data) of the UE by the eNB for the purpose of RLM/RLF of the TX UE below.

Embodiment 1

In relation to the above problem, the TX UE according to an embodiment may transmit predetermined data for triggering feedback of the RX UE based on that there is no data to be transmitted to the RX UE. The TX UE may determine declaration of sidelink radio link failure (RLF) based on the feedback.

Figure 11:
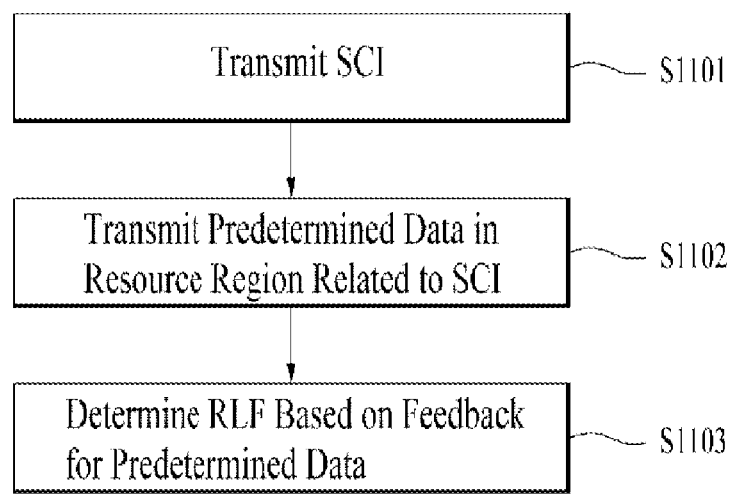
FIGS. 11 to 19 are diagrams for explaining embodiment(s)

In detail, the TX UE according to an embodiment may transmit sidelink control information (SCI) (S1101 of FIG. 11) and may transmit predetermined data in a resource region related to the SCI (S1102 of FIG. 11). Here, the predetermined data may be transmitted based on that there is no data to be transmitted to the RX UE by the TX UE, and the predetermined data may be related to trigger of the feedback. Based on feedback of the RX UE that receives the data, the TX UE may determine declaration of sidelink radio link failure (RLF) (S1103 of FIG. 11).

The TX UE may declare sidelink RLF based on HRAQ Discontinuous transmission (DTX) for the predetermined data. This case may be the case in which the maximum value of continuous HRAQ DTX related to RLF declaration is 1. Alternatively, the predetermined data may be transmitted twice or more, and the TX UE may declare sidelink RLF based on that continuous HRAQ DTX for the predetermined data twice or more reaches the maximum value. The maximum value may be indicated via RRC signaling.

Alternatively, the TX UE may determine the case in which HARQ feedback is received as IS and may determine the case in which HARQ feedback is not received as OOS. That is, because there is no data to be transmitted to the RX UE, when the TX UE triggers HARQ Feedback Report (e.g., HARQ ACK) to be transmitted to the RX UE, not based on the transmitted data and receives HARQ Feedback from the RX UE with respect to the triggered HARQ Feedback report, the TX UE may determine this case as IS, and when the TX UE does not receive HARQ Feedback for the triggered HARQ Feedback report, the TX UE may determine this case as Out Of Sync.

By configuring as described above, the problem in that a resource needs to be continuously maintained because RLF is not capable of being declared even if there is no data to be transmitted by the TX UE (in particular, the problem in that use efficiency of a resource is degraded because the corresponding resource is not capable of being allocated to another UE due to RLF in the case of mode 1) may be overcome.

In addition, the problem in that the TX UE having no signal to be transmitted to the RX UE is not capable of appropriately performing sidelink RLM. In more detail, the TX UE needs to periodically receive a signal (control or data) from a peer RX UE for sidelink RLM, and based thereon, a physical layer of the TX UE may transfer an In Sync event or an Out of Sync event to an RRC layer. The RRC Layer of the TX UE may perform sidelink RLM based on the IS event or the OOC event received from the physical layer. When the TX UE does not transmit anything because there is no signal to be transferred to the TX UE from the RX UE, the TX UE may not perform sidelink RLM. Thus, in this case, when the TX UE has data to be transmitted to the RX UE by the TX UE, the TX UE may perform SL RLM based on HARQ Feedback report for SL data to be transmitted to the RX UE. However, when there is no sidelink data to be transmitted to the RX UE, SL RLM may not be performed using HARQ Feedback Report for the sidelink data transmitted by the TX UE, and in this regard, the problem may be overcome through the above configuration.

Continuously, hybrid automatic retransmit request-acknowledgment (HARQ) feedback report of the TX UE may be configured to be disabled. And/or, the TX UE may not receive a signal from the RX UE for a preconfigured time. Here, the preconfigured time may be preconfigured to the UE, may be transmitted through higher layer/physical layer signaling, or may be randomly selected by the UE. That is, the description of the TX UE may be related to the case in which HARQ Feedback Report of the TX UE is configured to Disable, there is no data to be transmitted to the RX UE by the TX UE, or the TX UE does not receive a signal from the RX UE for a predetermined time.

When the HARQ Feedback report option is configured to be disabled by the eNB, the TX UE may not perform SL RLM based on HARQ feedback report. Thus, when the eNB disables the HARQ Feedback report option of the UE based on QoS (Reliability and Latency) requirements of SL data, the eNB may change the HARQ Feedback Report option and may perform sidelink RLM in a situation according to an embodiment. That is, in order to perform SL RLM based on the aforementioned HARQ Feedback trigger/report, a HARQ feedback report option configured by the eNB may be changed.

The TX UE may request a HARQ Feedback Report configuration change to the eNB, and the TX UE may receive radio resource control (RRC) signaling, downlink control information (DCI), or medium access control (MAC) control information (CE) HARQ Feedback Report configuration change from the eNB. That is, when changing the HARQ Feedback report option to be enabled from a disabled state, the TX UE may request the eNB to change the HARQ Feedback Report option, and the eNB may change the HARQ Feedback Report option of the UE to be enabled from a disabled state and may inform the TX UE of the change (via Dedicated RRC message or physical control channel (e.g., DCI) or MAC CE).

In another example, the TX UE may change a disabled state of the HARQ feedback report configuration to be enabled. The TX UE may autonomously change the HARQ Feedback Report option to be enabled from a disabled state. When the TX UE autonomously changes the HARQ Feedback report option, if the eNB first informs the TX UE of the HARQ Feedback Report option, the HARQ Feedback Report option may be configured to Disable, or otherwise, the eNB may determine "the TX UE autonomously determines the HARQ Feedback Report option" as an option and may inform the TX UE of this.

When the eNB changes the HARQ Feedback Report option and re-informs the RX UE of this and/or autonomously changes the HARQ Feedback Report option, the TX UE needs to inform the RX UE of the changed feedback option (Dedicated PC5 RRC Signal or MAC CE or Physical Control Channel (SCI)). The TX UE may inform the RX UE of that the HARQ Feedback Report configuration is changed via dedicated PC5 RRC signal, MAC CE, or SCI. When the TX UE notifies the RX UE through SCI, a HARQ feedback enabled/disabled indicator may be used. The HARQ feedback enabled/disabled indicator may be included in a $2^{nd}$ stage SCI format.

Based on the above procedure, the TX UE may continuously perform SL RLM/RLF. The TX UE may transmit a signal for triggering the HARQ Feedback report to the RX UE (Physical Control Channel (SCI) or MAC CE or PC5 RRC message). When the RX UE receives the HARQ Feedback Report (cause: PC5 RLM) from the TX UE, the RX UE may transfer the HARQ Feedback report (ACK feedback) to the TX UE. When receiving the HARQ Feedback report from the RX UE, the TX UE may determine a sidelink status as IS, and when the TX UE does not receive the HARQ Feedback report from the RX UE, the TX UE may determine the sidelink status as OOS.

A message for requesting a HARQ Feedback Report option change to the eNB by the TX UE in the above description may be a dedicated RRC message, and when the HARQ Feedback Report option change is capable of being requested through a MAC CE and is capable of being a physical control channel, the HARQ Feedback Report option change may also be requested through RRC CONNECTED On Demand SI. The HARQ Feedback Report option change message may include the following content.

The HARQ Feedback report Option change message may include at least one of a message type (HARQ Feedback Report option change message), a HARQ Feedback report option (disable or enable), or cause of HARQ Feedback report option change (PC5 RLM/RLF, etc.).

Figure 12:
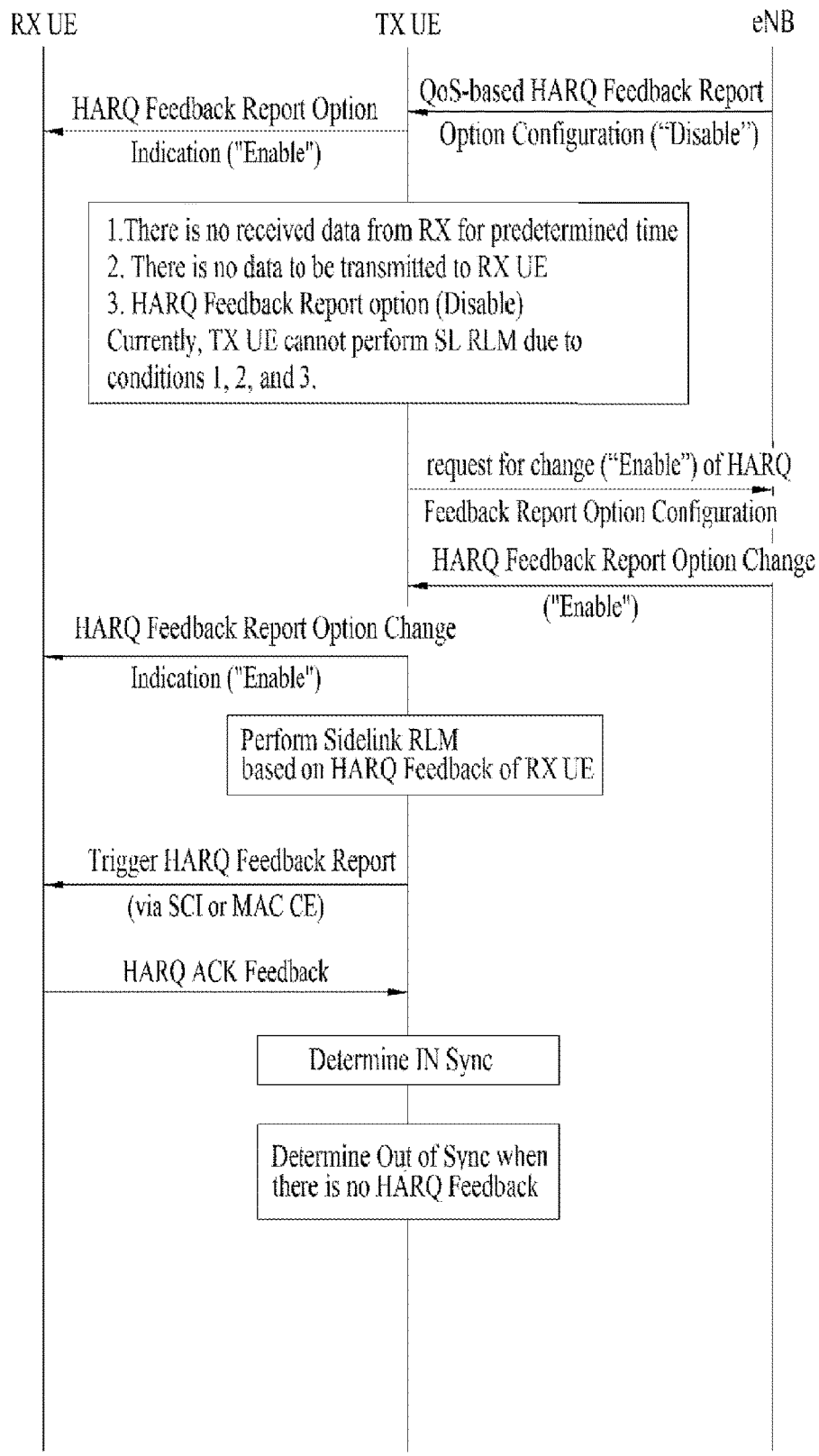
Figure 13:
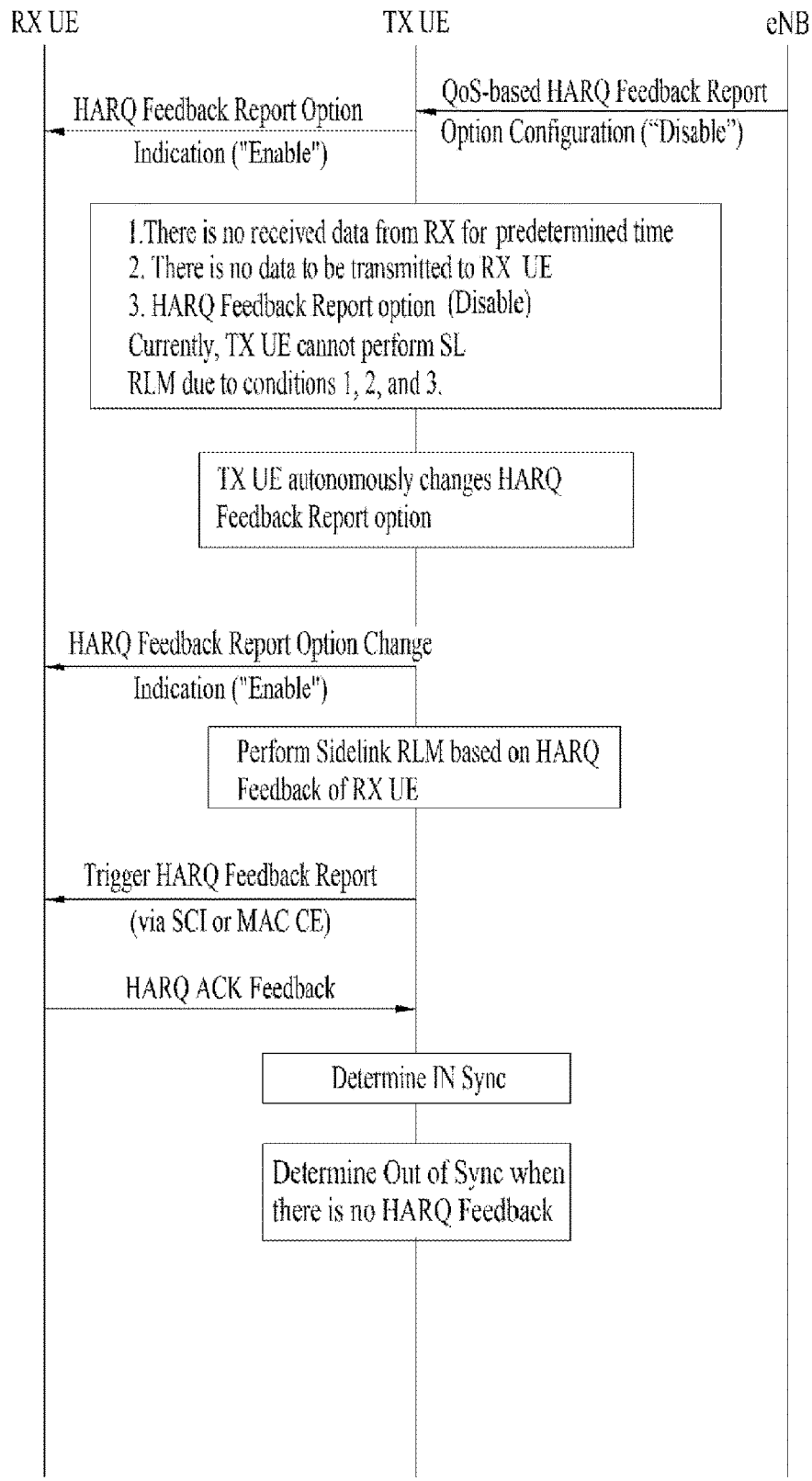

Among the aforementioned embodiments, FIG. 12 illustrates a procedure related to a change of a HARQ Feedback Report option by an eNB when there is no data to be transmitted to the RX UE by the TX UE, and FIG. 13 illustrates a procedure related to an autonomous change of a HARQ Feedback Report option by a UE when there is no data to be transmitted to the RX UE by the TX UE. FIGS. 12 and 13 are the same except for signaling related to a subject that changes the HARQ Feedback Report option, and a detailed description of each operation may be substituted with the above description.

Embodiment 2

A second embodiment relates to a UE operating method when the HARQ Feedback Report of the TX UE is configured to be disabled and the TX UE does not receive a signal from the RX UE for a predetermined time and there is no data to be transmitted to the RX UE by the TX UE.

When the eNB disables the HARQ Feedback report option of the UE based on QoS (Reliability and Latency) requirements of SL data, the eNB may change the HARQ Feedback Report option and may perform sidelink RLM/RLF.

According to the embodiment, when the HARQ Feedback Report of the TX UE is configured to Disable, and the TX UE does not receive a signal from the RX UE for a predetermined time and does not perform IS/OOS-based RLM, SL RLM/RLF needs to be performed based on the HARQ Feedback report because there is data to be transmitted to the RX UE, and in this regard, the embodiment proposes changing/switching the HARQ Feedback report option to be enabled when the HARQ Feedback Report option is configured to be disabled.

When the TX UE changes the HARQ Feedback report option to be enabled from a disabled state, the TX UE may request a change in the HARQ Feedback Report option to the eNB, and the eNB may change the HARQ Feedback Report option of the UE to be enabled from a disabled state and may inform the TX UE of this (via Dedicated RRC message or Physical Control Channel (For example, DCI) or MAC CE). Alternatively, the TX UE may autonomously change the HARQ Feedback Report option to be enabled from a disabled state. When the TX UE autonomously changes the HARQ Feedback report option, if the eNB first informs the TX UE of the HARQ Feedback Report option, the HARQ Feedback report option may be configured to Disable, or otherwise, the eNB may determine "the TX UE autonomously determines the HARQ Feedback Report option" as an option and may inform the TX UE of this. When the eNB changes the HARQ Feedback Report option and re-informs the RX UE of this or autonomously changes the HARQ Feedback Report option, the TX UE needs to inform the RX UE of the changed feedback option (Dedicated PC5 RRC Signal or MAC CE or Physical Control Channel (SCI)).

Based on the above procedure, the TX UE may continuously perform SL RLM/RLF. That is, when the TX UE receives HARQ NACK Feedback report for SL data transmitted to the RX UE from the RX UE, the TX UE may determine a sidelink status as OOS, and when the TX UE does not receive HARQ Feedback (ACK or NACK) report from the RX UE, the TX UE may determine the sidelink status as OOS. When the TX UE receives the HARQ ACK Feedback report for the SL data transmitted to the RX UE from the RX UE, the TX UE may determine the sidelink status as IS.

A message for requesting a HARQ Feedback Report option change to the eNB by the TX UE in the above description may be a dedicated RRC message, and when the HARQ Feedback Report option change is capable of being requested through a MAC CE and is capable of being a physical control channel, the HARQ Feedback Report option change may also be requested through RRC CONNECTED On Demand SI.

The HARQ Feedback report Option change message may include at least one of a message type (HARQ Feedback Report option change message), a HARQ Feedback report option (disable or enable), or a cause of HARQ Feedback report option change (PC5 RLM/RLF, etc.).

Figure 14:
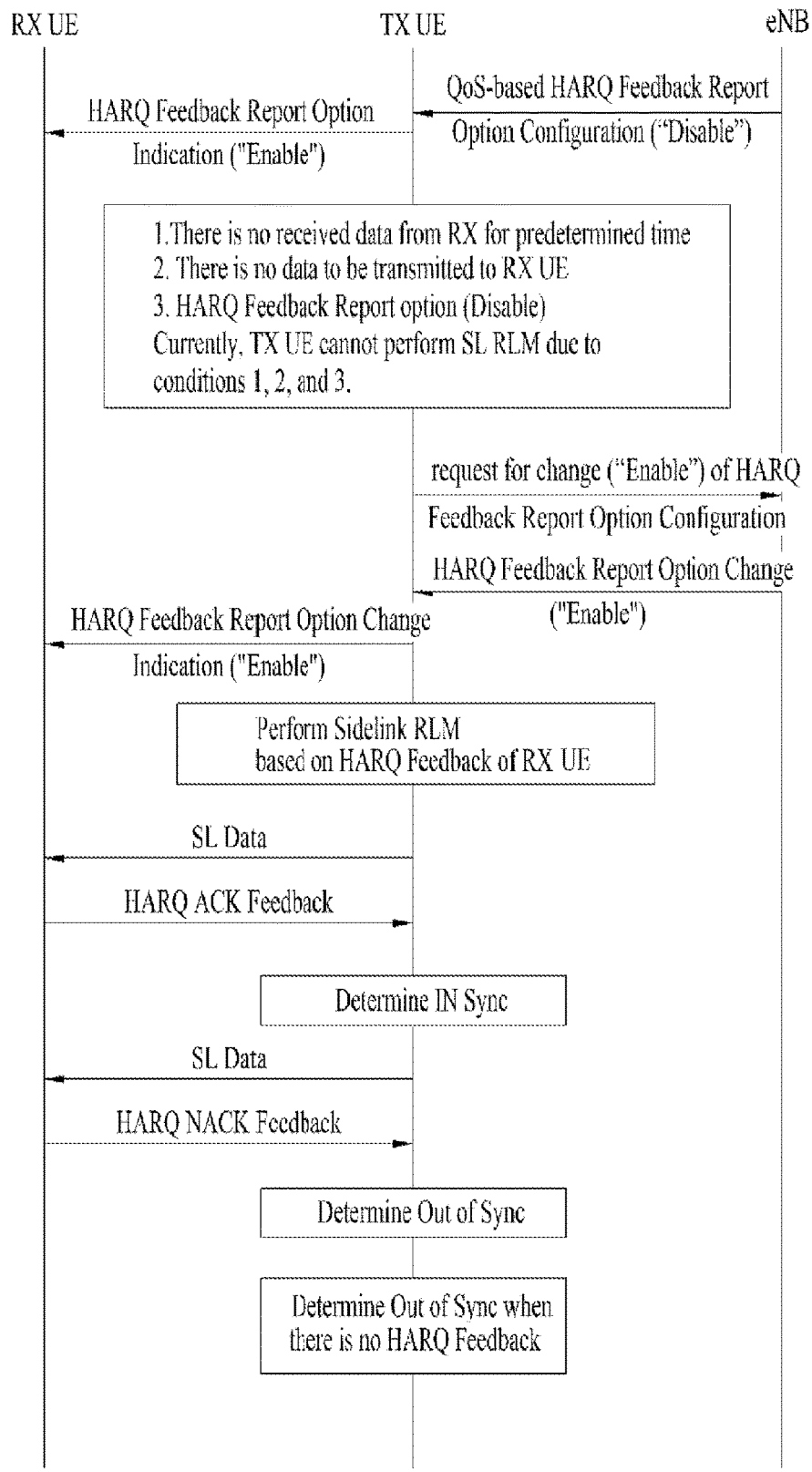
Figure 15:
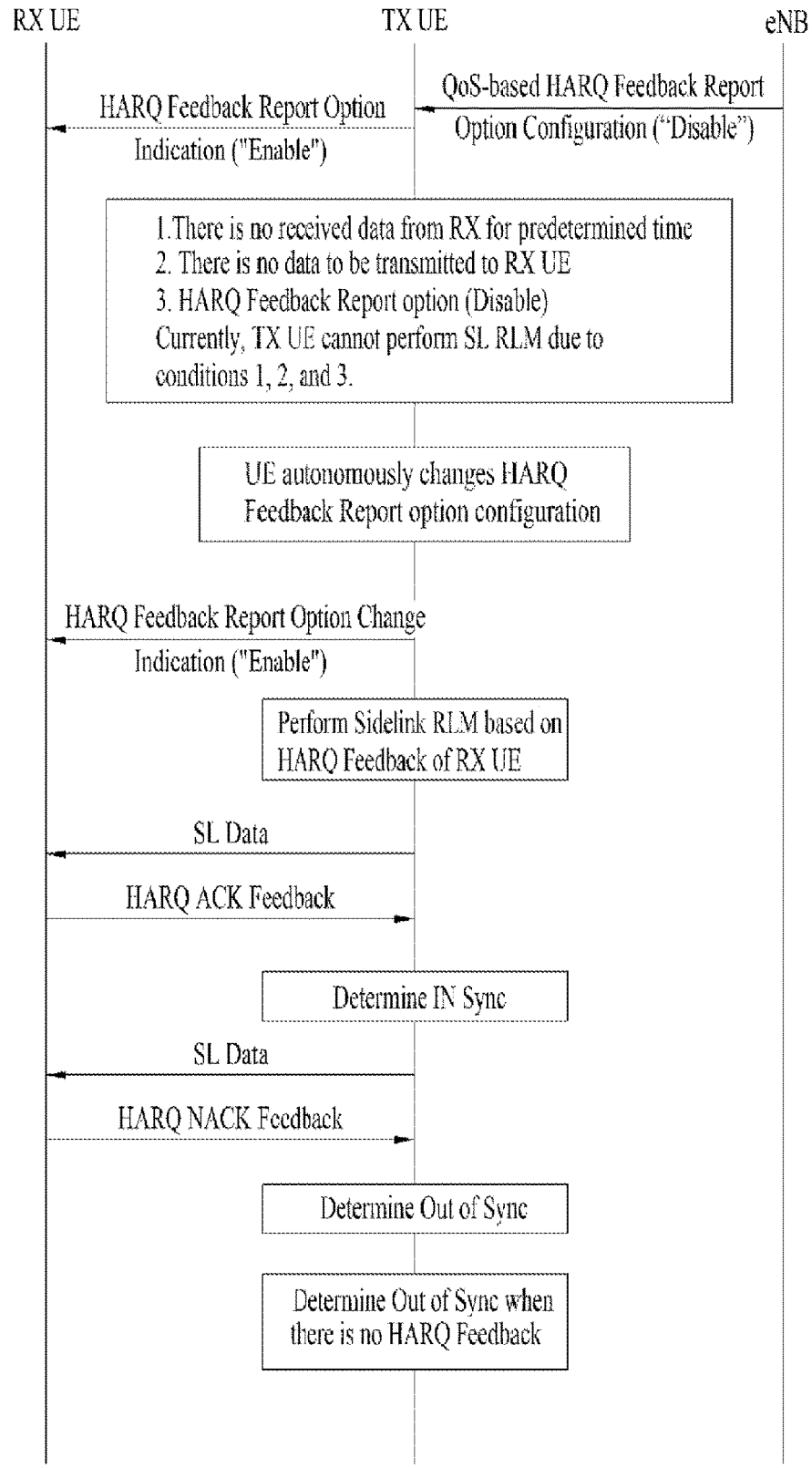

With regard to Embodiment 2, FIG. 14 illustrates a procedure related to a change of a HARQ Feedback Report option by an eNB when there is no data to be transmitted to the RX UE by the TX UE, and FIG. 15 illustrates a procedure related to an autonomous change of a HARQ Feedback Report option by a UE when there is no data to be transmitted to the RX UE by the TX UE. FIGS. 14 and 15 are the same except for signaling related to a subject that changes the HARQ Feedback Report option, and a detailed description of each operation may be substituted with the description in Embodiment 1 above.

Embodiment 3

As described above, when there is no reception signal (control or data) from the RX UE for a predetermined time and there is no SL data to be transmitted to the RX UE, the TX UE may trigger CSI report to instruct the RX UE to report the CSI measurement result (Dedicated PC5 RRC Signaling or MAC CE or Physical control Channel (SCI)). In addition, when the TX UE instructs the RX UE to report CSI for the purpose of SL RLM, if the TX UE does not receive continuous CSI reports from the RX UE for a predetermined time, the TX UE may declare the SL RLF.

Figure 16:
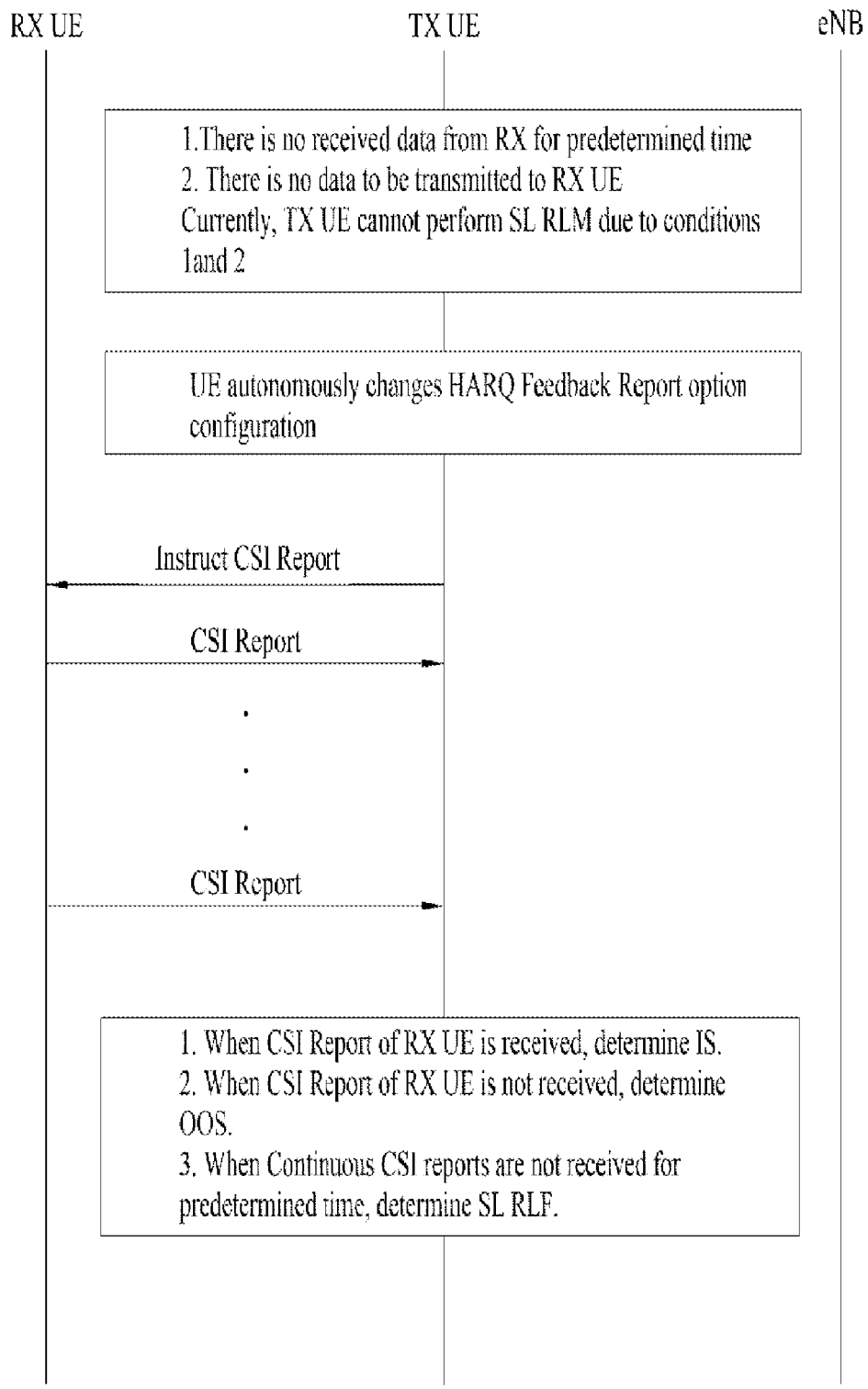

That is, when the TX UE triggers the CSI report of the RX UE for the purpose of SL RLM/RLF and does not receive continuous CSI reports from the RX UE for a predetermined time, the TX UE may declare the SL RLF. FIG. 16 illustrates an example in which the TX UE autonomously triggers a CSI report in order to perform SL RLM/RLF.

In another example, when the TX UE triggers a CSI report of the RX UE for the purpose of SL RLM/RLF and does not receive continuous CSI reports from the RX UE for a predetermined time or receives the CSI report from the RX UE but a result value of the CSI measurement Report is equal to or less than a specific threshold value, the TX UE may declare SL RLF.

That is, when there is no reception signal (control or data) from the RX UE for a predetermined time and there is no SL data to be transmitted to the RX UE, the TX UE may trigger CSI report to instruct the RX UE to report the CSI measurement result (Dedicated PC5 RRC Signaling or MAC CE or Physical control Channel (SCI)). In addition, when the TX UE instructs the RX UE to report CSI for the purpose of SL RLM/RLF, if the TX UE does not receive continuous CSI reports from the RX UE for a predetermined time, the TX UE may declare the SL RLF or when the CSI measurement report result value received from the RX UE is equal to or less than a specific threshold value, the TX UE may declare RLF.

Figure 17:
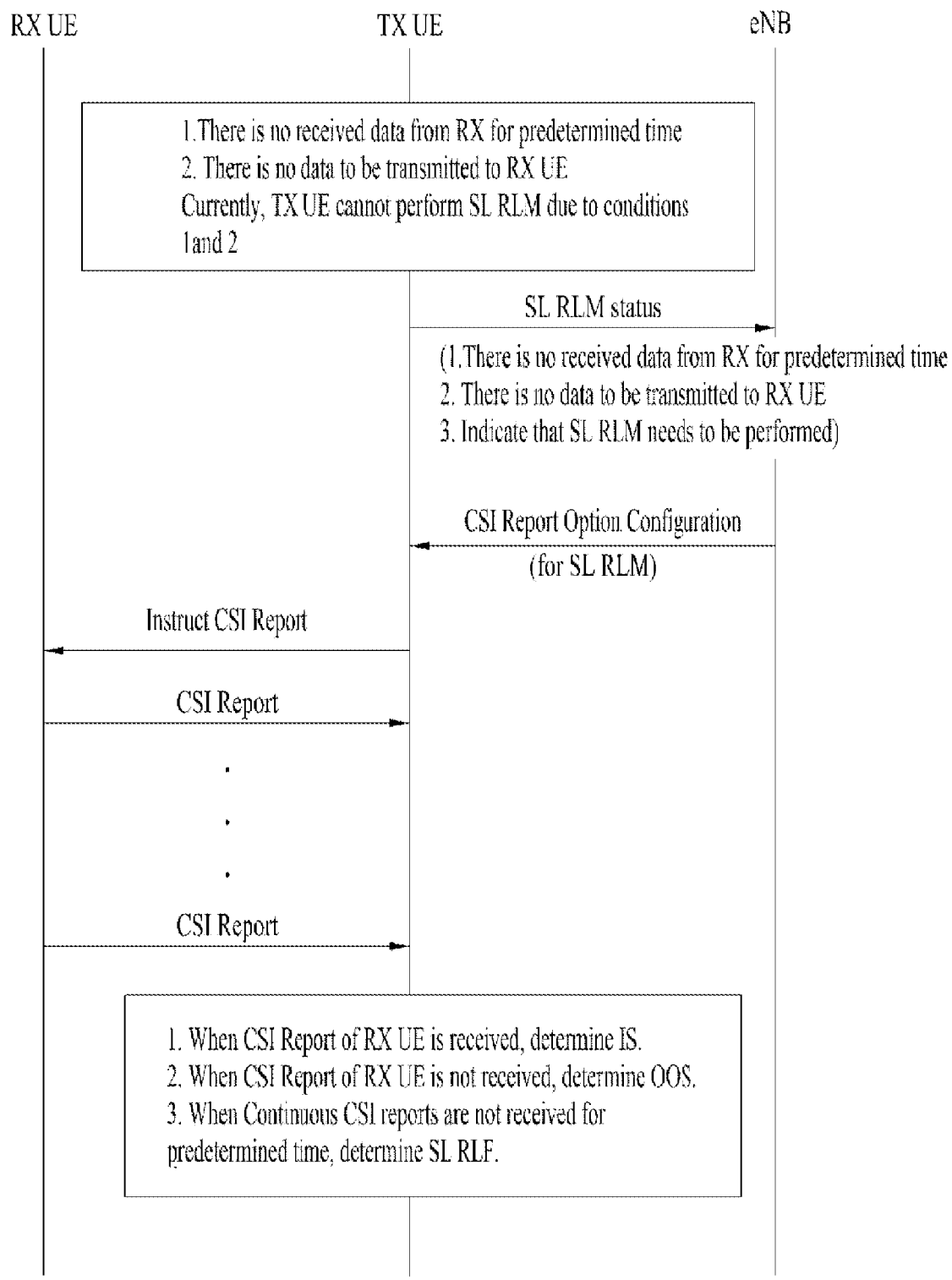
Figure 18:
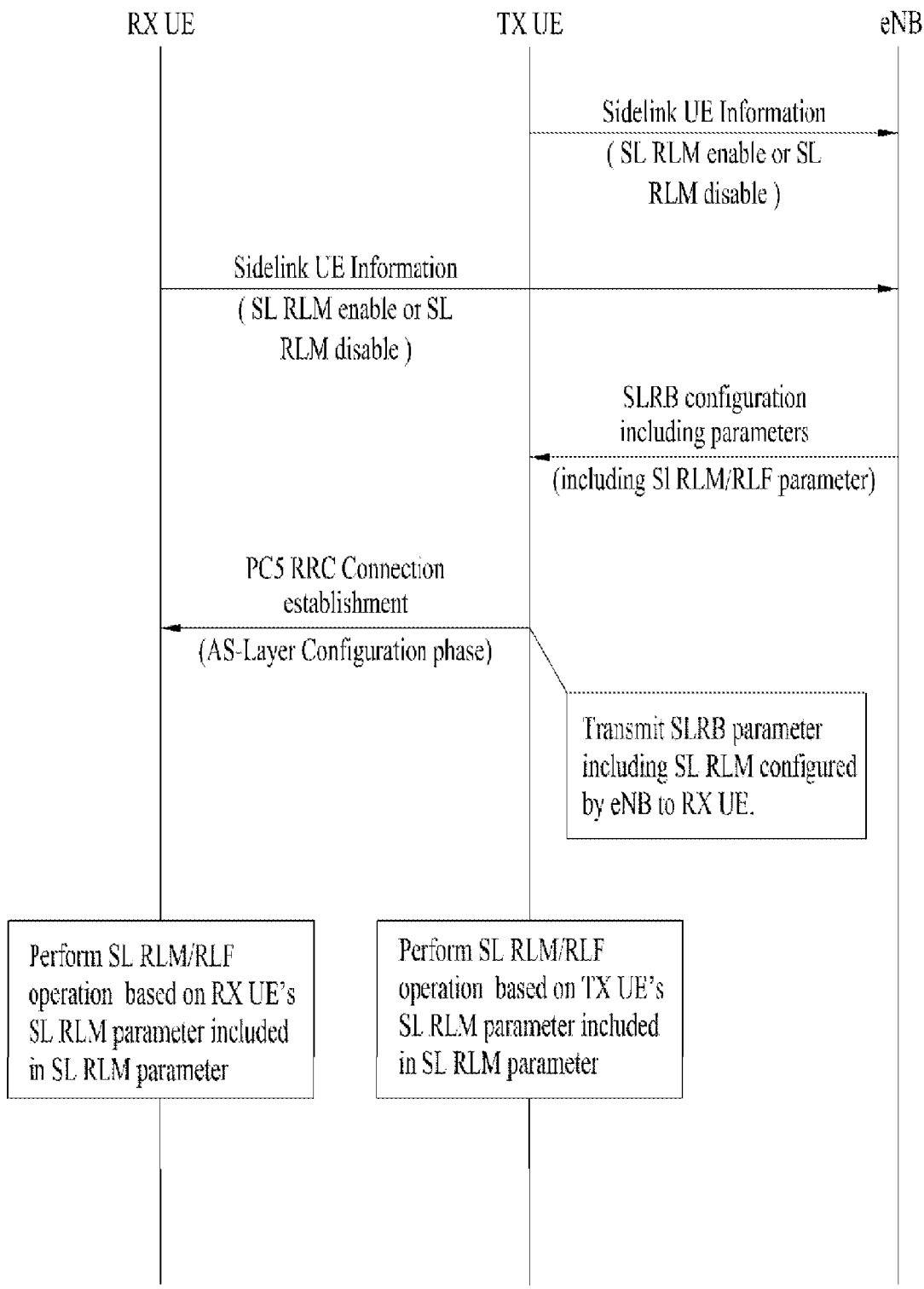

In this regard, FIG. 17 illustrates an example in which an eNB instructs the TX UE to perform a CSI report operation (an operation of reporting CSI measurement to the TX UE by the RX UE) for the purpose of RLM based on the state of SL RLM reported by the TX UE. That is, when the TX UE does not perform SL RLM based on IS/OOS since there is no data to be received from the RX UE for a predetermined time and the TX UE does not perform HARQ Feedback Report-based SL RLM/RLF for the transmitted data since there is not data to be transmitted to the RX UE, the TX UE may report the corresponding fact to the eNB (Sidelink UE Information or UE Assistance Information). The eNB may instruct the TX UE to trigger a CSI report operation based on information of SUI or UAI transmitted by the TX UE. The TX UE may perform SL RLM/RLF (proposed by an embodiment) based on the CSI report operation indication instructed by the eNB.

Embodiment 4

With regard to HARQ DTX as metric of the aforementioned sidelink RLM/RLF, when continuous (max count) HARQ DTX occurs for SL Data transmitted to the RX UE by the TX UE, the TX UE may declare sidelink RLF or when the TX UE does not receive HARQ Feedback for the SL data transmitted to the RX UE for a predetermined time, the TX UE may declare sidelink RLF. In this case, in order for the TX UE to determine RLF based on HARQ DTX, the TX UE needs to know the following content.

MAX HARQ DTX Count used to determine sidelink RLF
Time determine as HARQ DTX (i.e., a time or a timer until RLF is declared because HARQ Feedback for SL data transmitted to the RX UE is not capable of being received (HARQ DTX Timer for SL RLM) value)

The following embodiment proposes a method of acquiring a SL RLM metric parameter used for sidelink radio link monitoring (RLM) of the TX UE by the TX UE and a method of acquiring a sidelink RLM parameter by the RX UE.

When the TX UE configures a sidelink radio bearer (SLRB) parameter for sidelink communication of the UE by the eNB based on the sidelink UE Information transferred to the eNB, the parameter for sidelink RLM/RLF may also be contained in the SLRB parameter. Alternatively, the parameter for sidelink RLM/RLF may be included in the Sidlelink Radio Configuration parameter, not the SLRB parameter. Here, the SL RLM parameter included in the SLRB parameter is now described below.

1) HARQ DTX Count or HARQ DTX Timer

When continuous (HART DTX Count) HARQ DTX for data transmitted to the RX UE as a parameter used to determine SL RLF occurs, the TX UE may declare SL RLF. Alternatively, when the TX UE does not receive HARQ Feedback for SL Data transmitted to the RX UE within a HARQ DTX timer, the TX UE may declare SL RLF.

2) MAX number of the HARQ NACK Feedback

When the TX UE receives MAX HARQ NACK Feedback as a parameter used to determine SL RLF from the RX UE, the TX UE may declare SL RLF.

3) MAX number of the CSI Report Feedback

When the TX UE triggers the CSI report and instructs the RX UE to report CSI for the purpose of SL RLM and does not receive the CSI report by MAX count from the RX UE for a predetermined time, the TX UE may declare SL RLF.

4) CSI Measurement Threshold

When the TX UE triggers CSI report for the purpose of SL RLM to instruct the RX UE to report CSI, the TX UE may receive a report including a sidelink CSI measurement value from the RX UE, and when the CSI measurement value is equal to or less than a threshold, the TX UE may declare SL RLF.

5) RX UE's data reception inactivity timer

There is no signal (control or data) receives from the TX UE as a parameter used to determine SL RLF during a timer, the RX UE may declare SL RLF.

The eNB may configure a SLRB parameter based on the sidelink UE Information transferred by the UE, and according to an embodiment, whether an SL RLM-related parameter with an SLRB parameter of the UE is included in the sidelink UE Information transferred to the eNB by the UE may be determined by transferring indication about whether the UE performs sidelink RLM.

The UE may receive the SLRB parameter from the eNB using the following method.

V2X Specific System Information Block

Dedicated RRC Signaling

The SLRB parameter including the SL RLM parameter is acquired from the eNB using an ON Demand SIB method in the RRC CONNECTED state.

Alternatively, the UE may use the SLRB parameter including the SL RLM parameter using a preconfiguration method.

An embodiment proposes that the TX UE transfer the SLRB parameter including the SL RLM parameter acquired from the eNB to the RX UE through the dedicated PC5 RRC message. In more detail, the TX UE transfers the SL RLM parameter during AS Layer Configuration in a PC5 RRC Connection setup step between the TX UE and RX UE using a method of transferring the SL RLM parameter to the RX UE.

The UE may perform SL RLM as follows based on the SLRB parameter (including SL RLM parameters) transferred by the eNB and the SLRB parameter (including SL RLM parameters) acquired in the PC5 RRC Connection setup step (in the phase of AS-Layer Configuration).

In detail, an operation of the TX UE is now described below.

HARQ DTX Count or HARQ DTX Timer

When continuous (HART DTX Count) HARQ DTX for data transmitted to the RX UE occurs, the TX UE may declare SL RLF. Alternatively, when the TX UE does not receive HARQ Feedback for SL data transmitted to the RX UE within a HARQ DTX timer, the TX UE may declare SL RLF.

MAX number of the HARQ NACK Feedback

When receiving the MAX HARQ NACK Feedback from the RX UE, the TX UE may declare SL RLF.

MAX Number of the CSI Report Feedback

When the TX UE triggers the CSI report to instruct the RX UE to report CSI for the purpose of SL RLM and does not receive the CSI report by MAX count from the RX UE for a predetermined time, the TX UE may declare SL RLF.

CSI Measurement Threshold

When the TX UE triggers the CSI report to instruct the RX UE to report CSI for the purpose of SL RLM, the TX UE may receive the report including a sidelink CSI measurement value from the RX UE, and when the CSI measurement value is equal to or less than a threshold, the TX UE may declare SL RLF.

When there is no signal (control or data) to be received from the TX UE during a data reception inactivity timer, SL RLF may be declared.

According to the above description, the TX UE may receive a parameter required for SL RLM as the SLRB parameter from the eNB and may perform SL RLM. In addition, the RX UE may receive the SL RLM parameter, which is received from the eNB by the TX UE in the PC5 RRC connection configuration step (in the phase of AS-Layer Configuration) between the TX UE and the RX UE, from the TX UE, and thus the RX UE may also perform SL RLM/RLF based on the SL RLM/RLF parameter included in the SLRB parameter.

FIG. 17 illustrates an example of the aforementioned Embodiment 4, and a detailed description thereof may refer to the above description.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
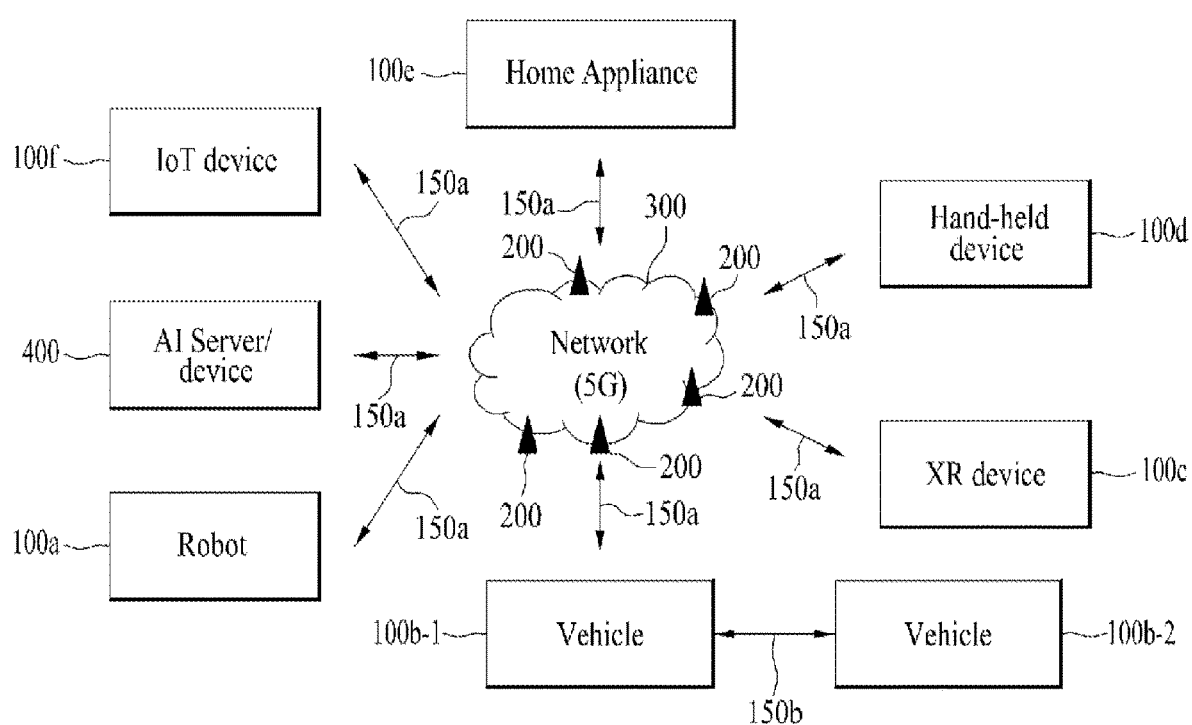

FIG. 19 illustrates a communication system 1 applied to the present disclosure.

Referring to FIG. 19, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3 G network, a 4 G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 20:
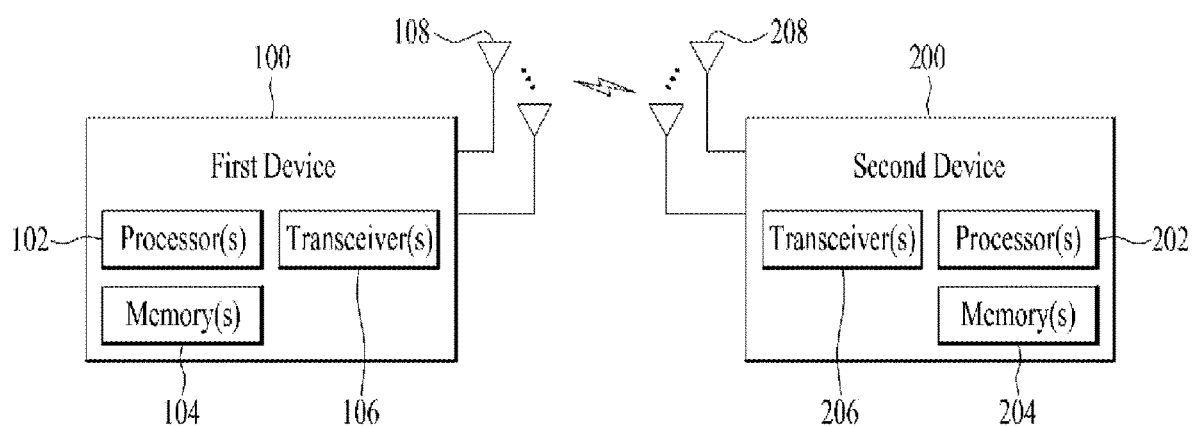
FIGS. 20 to 25 are diagrams for explaining various apparatus to which embodiment(s) are applicable.

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
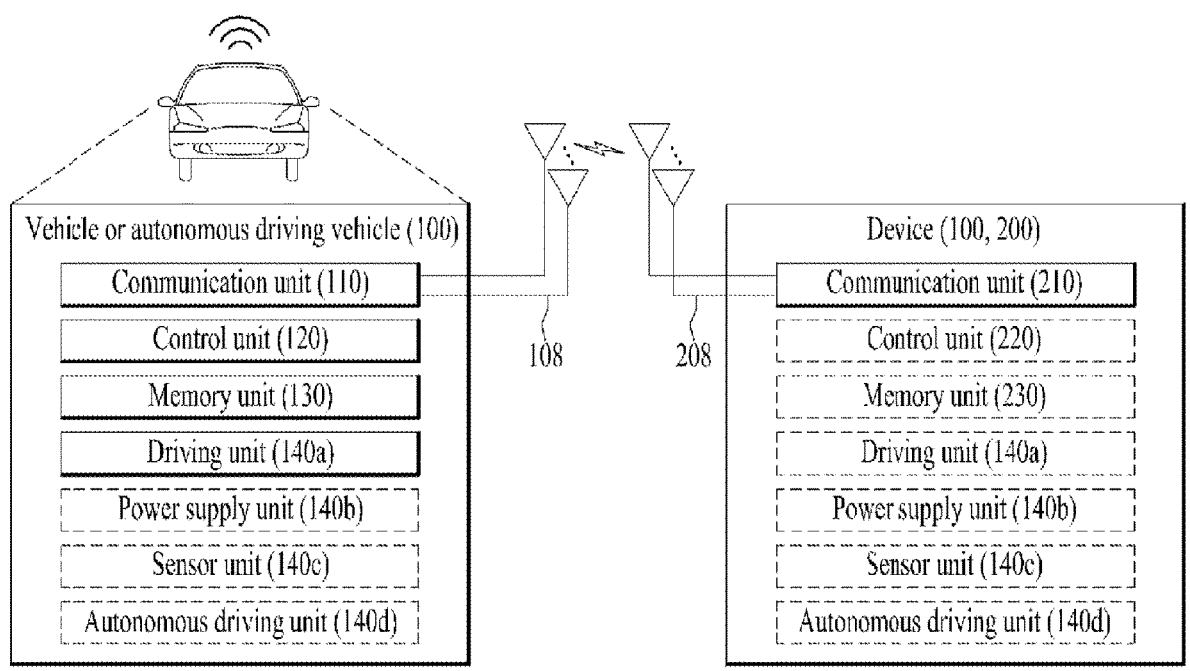

Examples of a Vehicle or an Autonomous Driving Vehicle Applicable to the Present Disclosure FIG. 21 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 43, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 22:
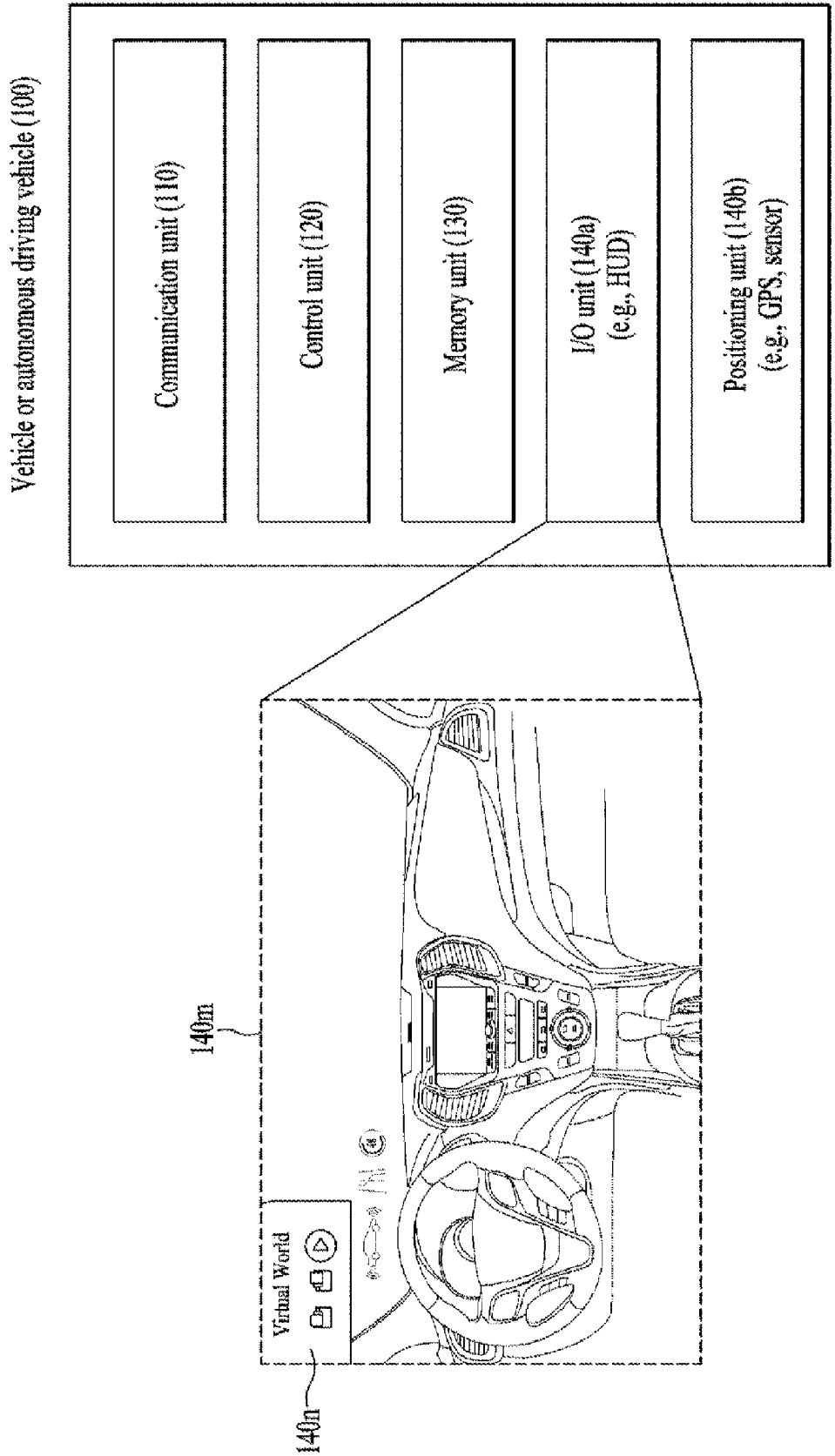

FIG. 22 illustrates a vehicle applied to the present disclosure. The vehicle may be implemented as a transport means, an aerial vehicle, a ship, etc.

Referring to FIG. 22, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 43.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 23:
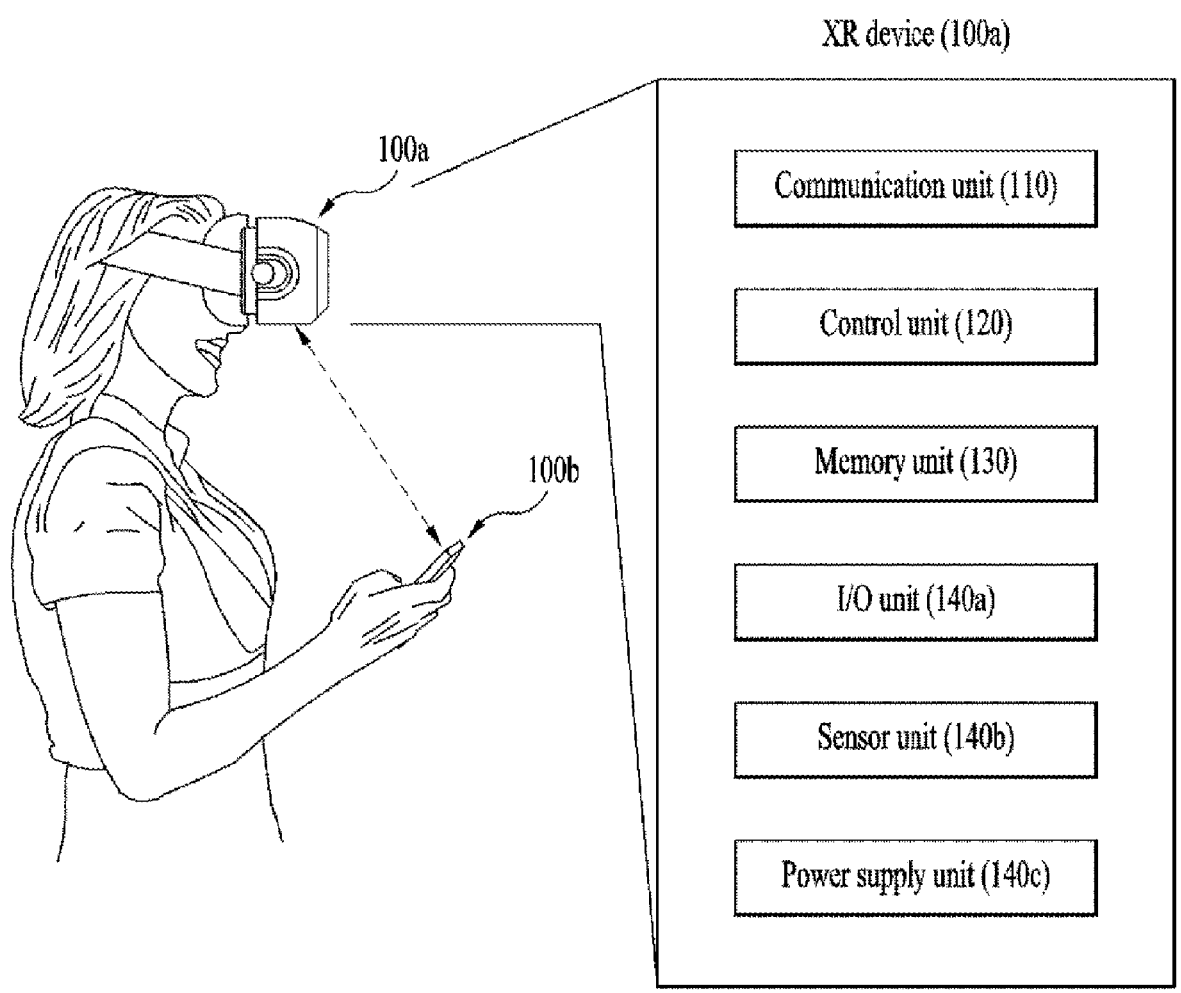

FIG. 23 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 23, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 43, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 24:
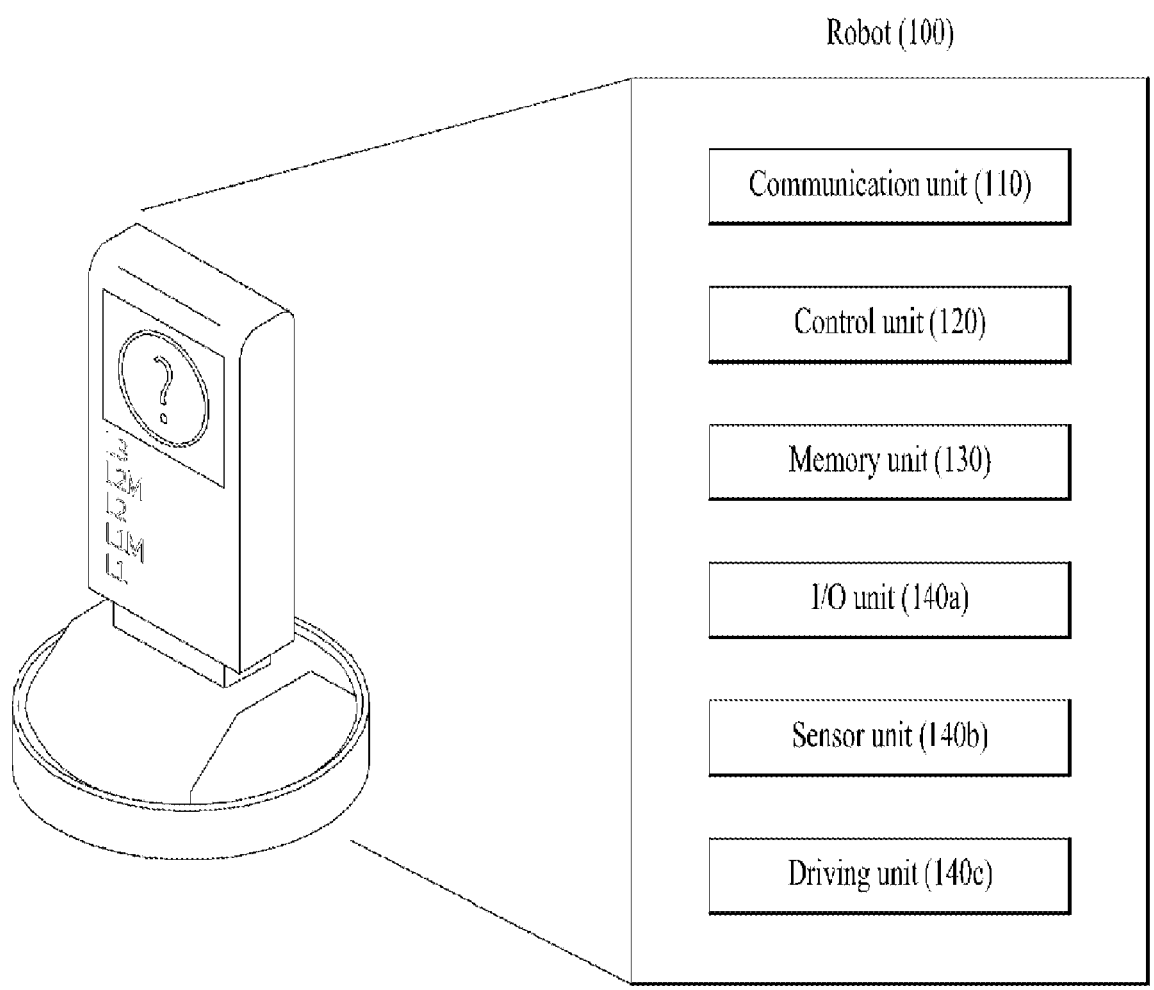

FIG. 24 illustrates a robot applied to the present disclosure. The robot may be categorized into an industrial robot, a medical robot, a household robot, a military robot, etc., according to a used purpose or field.

Referring to FIG. 24, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 20, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI device to which the present disclosure is applied.

Figure 25:
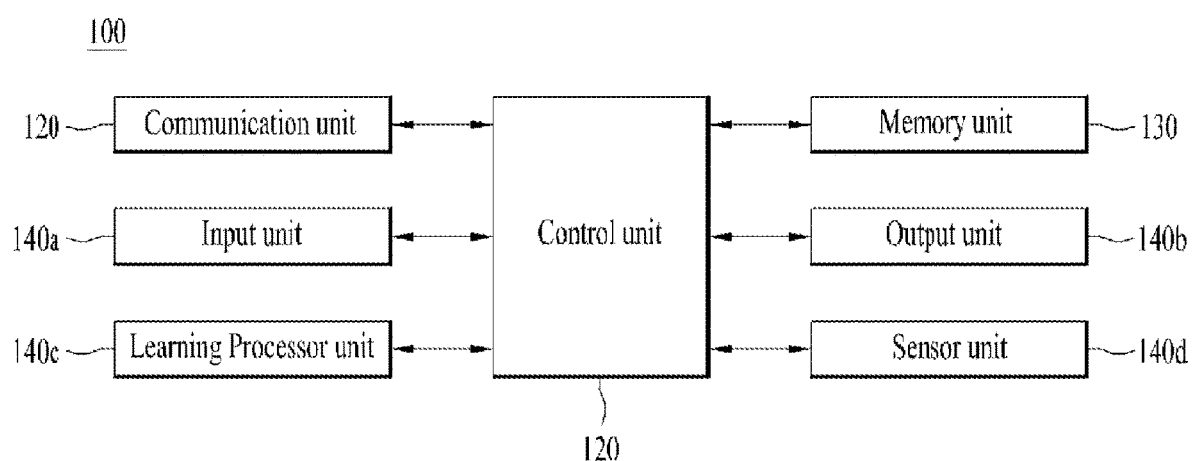

FIG. 25 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 25, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 20, respectively.

The communication unit 110 may transmit and receive wired/radio signals (e.g., sensor information, user input, learning models, or control signals) to and from external devices such as other AI devices (e.g., 100x, 200, or 400 of FIG. 19) or an AI server (e.g., 400 of FIG. 19) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 19). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 19). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

[Industrial Availability]

The above-described embodiments of the present disclosure are applicable to various mobile communication systems.

The invention claimed is:

1. An operating method of a transmitting user equipment (TX UE) in a wireless communication system, the method comprising:
   reporting by the TX UE to a base station, QoS requirements;
   receiving, by the TX UE, a configuration related to a hybrid automatic retransmit request-acknowledgment (HARQ) feedback is disabled;
   transmitting by the TX UE to a receiving UE (RX UE), the configuration,
   wherein, based on i) HARQ Feedback of the TX UE is configured to Disable, ii) there is no data to be transmitted to the RX UE, and iii) the TX UE does not receive a signal from the RX UE for a predetermined time, the TX UE triggers HARQ Feedback Report to the RX UE and the TX UE determines whether the RX UE is IN SYNC or OUT OF SYNC based on the result of triggering.

2. The method of claim 1, wherein the TX UE declares sidelink RLF based on HARQ discontinuous transmission (DTX).

3. The method of claim 1, wherein:
   the TX UE requests a HARQ feedback report configuration change to a base station (BS); and
   the TX UE receives HARQ feedback report configuration change from the BS Via one of radio resource control (RRC) signaling, downlink control information (DCI), or a medium access control (MAC) control information (CE).

4. The method of claim 3, wherein the TX UE changes the HARQ feedback report configuration, configured to be disabled, to be enabled.

5. The method of claim 4, wherein the TX UE informs the RX UE of a change in the HARQ feedback report configuration through a dedicated PCS RRC signal, MAC CE, or SCI.

6. A transmitting user equipment (TX UE) in a wireless communication system, the TX UE comprising:
   at least one processor; and
   at least one computer memory operatively connected to the at least one processor and configured to store commands for allowing the at least one processor to perform operations when being executed,
   wherein the operations includes:
   reporting to a base station QoS requirements;
   receiving a configuration related to a hybrid automatic retransmit request- acknowledgment (HARQ) feedback is disabled;
   transmitting to a receiving UE (RX UE), the configuration,
   wherein, based on i) HARQ Feedback of the TX UE is configured to Disable, ii) there is no data to be transmitted to the RX UE, and iii) the TX UE does not receive a signal from the RX UE for a predetermined time, the TX UE triggers HARQ Feedback Report to the RX UE and the TX UE determines whether the RX UE is IN SYNC or OUT OF SYNC based on the result of triggering.

7. The TX UE of claim 6, wherein the TX UE communicates with at least one of another UE, a UE related to an autonomous driving vehicle, a base station (BS), or a network.

8. A processor for performing operations for a transmitting user equipment (TX UE) in a wireless communication system, the operations comprising:
   reporting to a base station QoS requirements;
   receiving a configuration related to a hybrid automatic retransmit request-acknowledgment (HARQ) feedback is disabled;
   transmitting to a receiving UE (RX UE), the configuration,
   wherein, based on i) HARQ Feedback of the TX UE is configured to Disable, ii) there is no data to be transmitted to the RX UE, and iii) the TX UE does not receive a signal from the RX UE for a predetermined time, the TX UE triggers HARQ Feedback Report to the RX UE and the TX UE determines whether the RX UE is IN SYNC or OUT OF SYNC based on the result of triggering.

9. A computer-readable non-volatile recording medium for storing at least one computer program including a command for allowing at least one processor to perform operations for a transmitting user equipment (TX UE) when being executed by the at least one processor, the operations comprising:
   reporting to a base station QoS requirements;
   receiving a configuration related to a hybrid automatic retransmit request-acknowledgment (HARQ) feedback is disabled;
   transmitting to a receiving UE (RX UE), the configuration,
   wherein, based on i) HARQ Feedback of the TX UE is configured to Disable, ii) there is no data to be transmitted to the RX UE, and iii) the TX UE does not receive a signal from the RX UE for a predetermined time, the TX UE triggers HARQ Feedback Report to the RX UE and the TX UE determines whether the RX UE is IN SYNC or OUT OF SYNC based on the result of triggering.

* * * * *